US009849869B2

(12) United States Patent
Frank et al.

(10) Patent No.: US 9,849,869 B2
(45) Date of Patent: Dec. 26, 2017

(54) SYSTEMS AND METHODS FOR IMPLEMENTING DYNAMIC OPERATING MODES AND CONTROL POLICIES FOR HYBRID ELECTRIC VEHICLES

(71) Applicant: Efficient Drivetrains, Inc., Milpitas, CA (US)

(72) Inventors: Andrew Frank, Davis, CA (US); Chan-Chiao Lin, Dixon, CA (US); Krishna Kumar, Dixon, CA (US); Anthony Serra, Dixon, CA (US)

(73) Assignee: EFFICIENT DRIVETRAINS, INC., Milpitas, CA (US)

( * ) Notice: Subject to any disclaimer, the term of this patent is extended or adjusted under 35 U.S.C. 154(b) by 0 days.

(21) Appl. No.: 14/700,535

(22) Filed: Apr. 30, 2015

(65) Prior Publication Data
US 2015/0232082 A1    Aug. 20, 2015

Related U.S. Application Data

(63) Continuation of application No. 13/762,731, filed on Feb. 8, 2013, now Pat. No. 9,045,136.

(51) Int. Cl.
| | |
|---|---|
| *B60W 20/00* | (2016.01) |
| *B60W 10/02* | (2006.01) |
| *B60W 10/08* | (2006.01) |
| *B60K 6/42* | (2007.10) |
| *B60W 20/10* | (2016.01) |
| *B60W 10/06* | (2006.01) |
| *B60W 10/10* | (2012.01) |
| *B60W 30/188* | (2012.01) |
| *B60W 30/182* | (2012.01) |

(52) U.S. Cl.
CPC ............ *B60W 20/10* (2013.01); *B60W 10/02* (2013.01); *B60W 10/06* (2013.01); *B60W 10/08* (2013.01); *B60W 10/10* (2013.01); *B60W 30/182* (2013.01); *B60W 30/188* (2013.01); *B60W 2510/083* (2013.01); *B60W 2710/081* (2013.01); *B60W 2710/083* (2013.01); *Y10S 903/93* (2013.01)

(58) Field of Classification Search
None
See application file for complete search history.

(56) References Cited

U.S. PATENT DOCUMENTS

| | | | | |
|---|---|---|---|---|
| 6,054,844 | A * | 4/2000 | Frank | B60K 6/46 180/65.21 |
| 8,251,850 | B2 * | 8/2012 | Phillips | B60K 6/365 475/5 |
| 2008/0300743 | A1 * | 12/2008 | Conlon | B60K 6/40 701/22 |
| 2013/0324357 | A1 * | 12/2013 | Stenson | B60W 20/10 477/3 |

* cited by examiner

*Primary Examiner* — Rami Khatib

(57) ABSTRACT

Systems and/or methods for controlling dual motor-dual clutch powertrains for HEV and PHEV vehicles are disclosed. In one embodiment, a method is disclosed comprising: determining the state of charge (SOC) of said batteries; determining the speed of the vehicle; if the SOC is greater than a given first threshold, selecting a charge-depleting operational mode of said vehicle; during operation of said vehicle, if the SOC is less than a given second threshold, selecting a charge-sustaining operating mode of said vehicle. In another embodiment, a system having a controller that operates the powertrain according to various embodiments is disclosed.

6 Claims, 16 Drawing Sheets

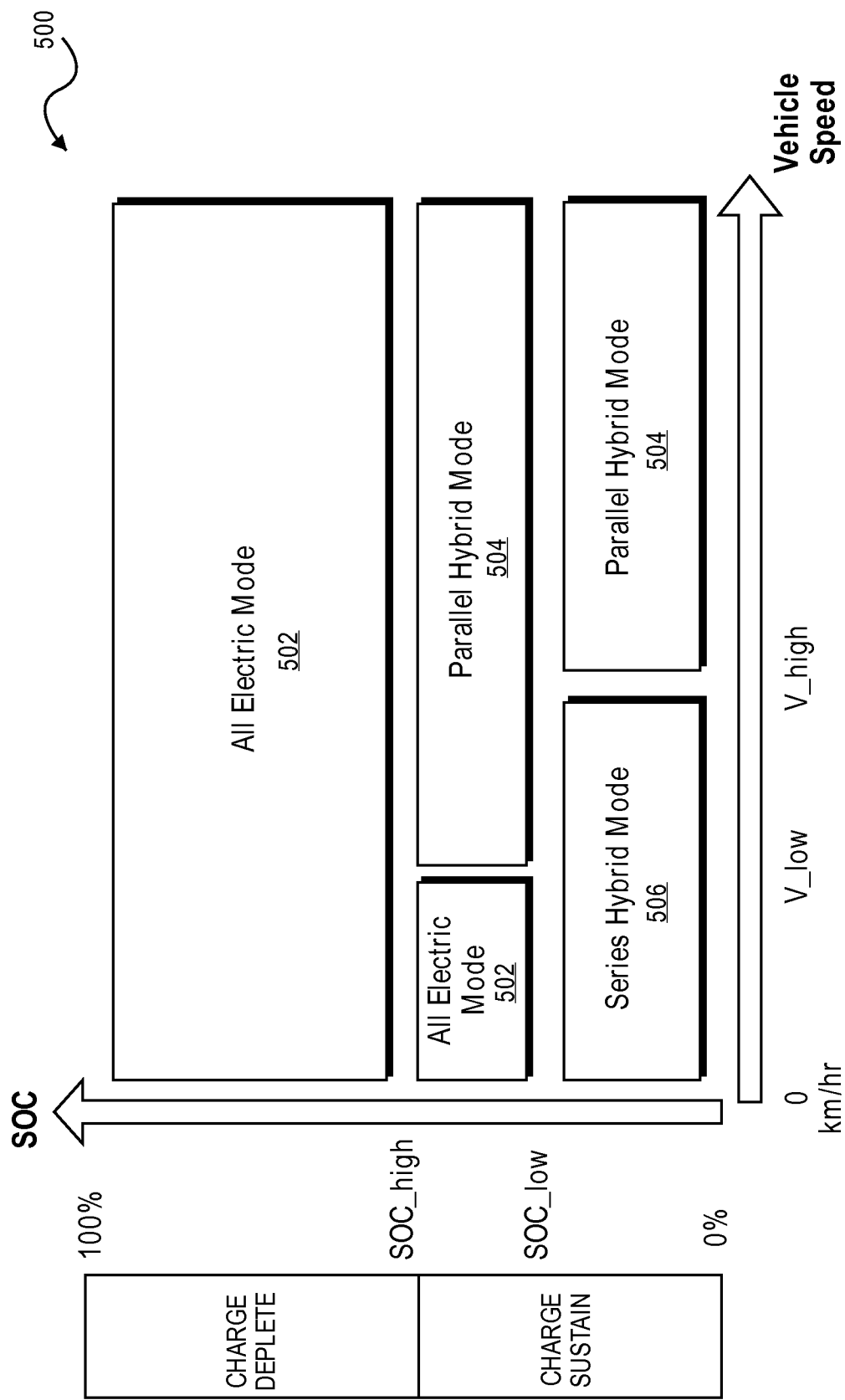

SYSTEMS AND METHODS FOR IMPLEMENTING DYNAMIC OPERATING MODES AND CONTROL POLICIES FOR HYBRID ELECTRIC VEHICLES

CROSS-REFERENCE TO RELATED APPLICATIONS

The present application is a Continuation application of, and claims benefit of priority to, co-depending: U.S. patent application Ser. No. 13/762,731 filed on Feb. 8, 2013 entitled, "SYSTEMS AND METHODS FOR IMPLEMENTING DYNAMIC OPERATING MODES AND CONTROL POLICIES FOR HYBRID ELECTRIC VEHICLES" which is incorporated herein by reference in its entirety.

BACKGROUND

In the field of electric vehicles (EVs), hybrid electric vehicles (HEVs) and plug-in hybrid electric vehicles (PHEVs), there are many possible powertrains configurations that may affect a wide variety of operating modes. For example, in the field of HEVs alone, HEV powertrains may be constructed to affect series, parallel, series-parallel and all-electric modes of operation. In addition, certain of these modes may be constructed to operate according to different policies,—e.g., charge-sustaining, charge-depletion and the like.

These different modes and policies offer certain advantages—e.g., range extension, fuel efficiency, operation of the internal combustion engine (ICE) on its ideal-operating line (IOL) and all electric operation. It would be desirable to have a single powertrain that may affect a plurality of these control policies and operating modes—for example, during possibly different drive conditions and under possibly with different policies, according to a desired drive characteristic metric, such as fuel efficiency, range extension, maximum distance on electric energy, efficient battery usage or the like.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

Systems and/or methods for controlling dual motor-dual clutch powertrains for HEV and PHEV vehicles are disclosed. In one embodiment, a method is disclosed comprising: determining the state of charge (SOC) of said batteries; determining the speed of the vehicle; if the SOC is greater than a given first threshold, selecting a charge-depleting operational mode of said vehicle; during operation of said vehicle, if the SOC is less than a given second threshold, selecting a charge-sustaining operating mode of said vehicle. In another embodiment, a system having a controller that operates the powertrain according to various embodiments is disclosed.

Other features and aspects of the present system are presented below in the Detailed Description when read in connection with the drawings presented within this application.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

FIGS. 5A and 5B depict two possible embodiments of mode control and/or operation for a HEV and/or PHEV vehicle, as possibly architected, e.g., in FIG. 2.

DETAILED DESCRIPTION

Figure 1:
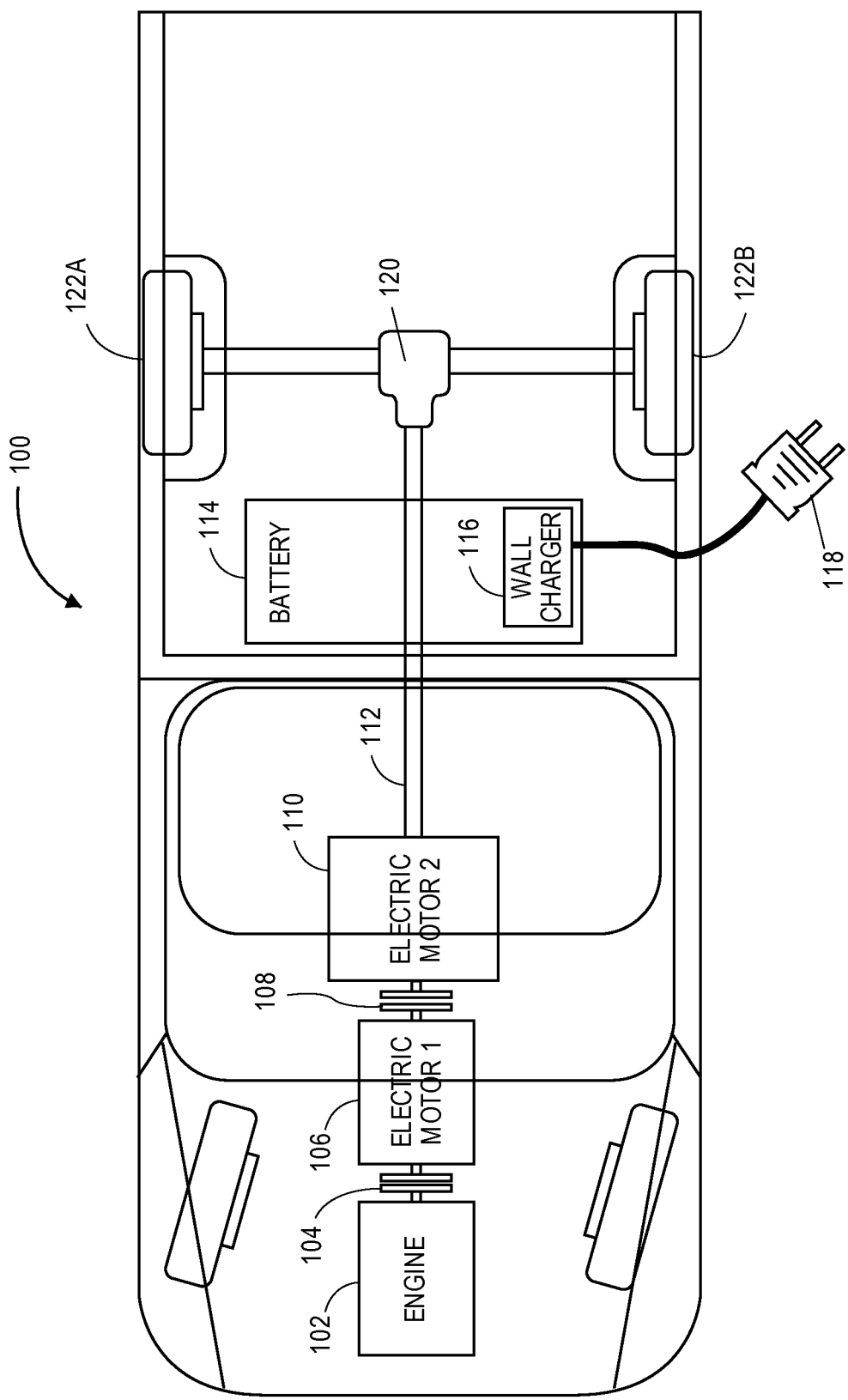
FIG. 1 shows one possible embodiment of a hybrid or plug-in hybrid electric vehicle, as made according to the principles of the present application.

As utilized herein, terms "component," "system," "interface," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

Introduction

In one embodiment, control algorithms are provided for management of dynamic operating modes and/or control policies for Hybrid Electric Vehicles (HEVs) which may also apply to both plug-in and non-plug HEVs. In addition, these control algorithms may allow efficient, cost effective and responsive operation of the batteries and electric motor. In other embodiments, it may also allow the Prime Mover (PM) to be minimized for a high degree of hybridization. Suitable PMs may include: ICE, fuel cells or any other combustion, chemical and/or fuel based (e.g. liquid or gaseous fuels as are known) prime movers.

By a "high degree of hybridization", it is meant that the vehicle (e.g. HEV, PHEV or the like) and/or powertrain may be designed to use as much electrical energy stored in a battery to provide motive power to the vehicle during a drive cycle, as possible. The electrical energy stored in the battery may be derived from a plurality of sources: regenerative braking, charging operation of the PM or from a wall socket or other external source of electrical charge. In other embodiments, the electricity—e.g., from on-board and off-board sources and through the electric motor or motors and/or batteries—may be managed by multiple controllers connected together in various fashions that may be able to provide the proper management of the batteries for improved range, life and performance.

It is known, in many cases, that a battery's life in an electric or hybrid vehicle may be less than ¼ of its predicted life. In some embodiments, the hybrid vehicle (HEVs, PHEVs or the like) manages how the vehicle is used and/or driven to get a desired range and life out of a particular set of batteries. Thus, in some embodiments, the control of the engine, transmission and battery pack are desired to be coordinated with a software controller to achieve a desired fuel economy or fuel consumption—and, possibly, with a desired electric range as well as battery life.

It will be appreciated that the control software for the vehicle may be executing upon one controller (and that one controller sending out signals to the various components of the powertrain) or alternatively, the control software may be distributed in any known fashion to multiple controllers—possibly, with a subset of the multiple controllers in communications with a subset of the multiple controllers. Thus, any recitation of the term "controller" may also encompass the embodiments comprising multiple controllers and distributed control software.

One Vehicle/Powertrain Embodiment

FIG. 1 is one possible vehicle and/or powertrain platform (100)—among many possible vehicle and/or powertrain embodiments in which present techniques may find applicability.

Vehicle 100 (as depicted in FIG. 1) comprises a dual clutch-dual motor HEV/PHEV powertrain that has the ability to operate as an all-electric vehicle, a hybrid vehicle or a plug-in hybrid electric vehicle—at various times during a drive cycle and dynamically under controller operation. Engine (or any suitable PM) 102 is placed on a common driveshaft 112 with two electric motors 106 and 110. In between engine 102 and motor 106 is clutch 104 and between motor 106 and motor 110 is clutch 108. Clutches 104 and 108, as will be discussed in further detail below, may be actuated in order to affect different modes of operation of vehicle 100.

Battery 114 powers motors 106 and 110 with electric charge. Battery 114 may acquire its electric power via on-board charging (e.g. with engine 102 and motor 106), regenerative braking (e.g. with motor 110, either alone or in combination with motor 106) or via an optional wall charger 116. Wall charger 116 may take electrical energy off a wall socket and charger 116 may be designed according to the local standard for grid distribution.

Driveshaft 112 delivers mechanical power to and from final drive 120—which then delivers such power to the wheels 122a and 122b, which are rear wheels in this embodiment. Final drive 120 may comprise a differential—in optional combination with additional gearing, such as, from a manual transmission, automatic transmission, continuously variable transmission (CVT) whether mechanical or electronic, or power split device (PSD) as is used in the Toyota Prius vehicle. In addition, it should be appreciated that front wheel or all-wheel drive embodiments are also possible embodiments and are under the scope of the present application. Other possible embodiments might include: (1) a front engine/2 motor front wheel drive configuration; (2) a front engine/one or two motor/variable transmission (e.g., CVT, automatic transmission, manual transmission, electronic transmission, planetary gear transmission and the like) configuration; and (3) a front engine/one motor transmission and a rear motor transmission configuration. Several such embodiments are disclosed in commonly owned patent application Ser. No. 13/762,860, entitled "POWERTRAIN CONFIGURATIONS FOR TWO-MOTOR, TWO-CLUTCH HYBRID ELECTRIC VEHICLES" and filed same day as this present application (and herein incorporated by reference).

In one embodiment, motor 110 may have a higher torque and/or power rating than motor 106. The power rating of the two motors may be adjusted for the application of the vehicle; but in one embodiment, motor 106 may be ½ the power and torque of motor 110 and the PM may be approximately the power of motor 106. In another embodiment—where the All Electric Mode may have a higher performance than under ICE operation—then the ICE and motor 106 can be much smaller than motor 110. Such a vehicle may be used in special circumstances where there is limited charging infrastructure to provide electric energy for all electric operation and other potential circumstances.

In yet another embodiment, both motors 106 and 110 may be downsized for cost/weight reduction. In such an embodiment, it may be desirable to operate both motors 106 and 110—with clutch 108 closed more often, so that there would be sufficient torque available upon vehicle launch and/or up a desirable grade (e.g., 30% grade). Such sizing of motors may be designed in particular with the size, weight and/or desired functionality (e.g., passenger vehicle, light duty truck, delivery vehicle or the like) of the vehicle in mind. In some embodiments, motor 110 may comprise a high torque motor and motor 106 may comprise a lower torque motor.

Figure 2:
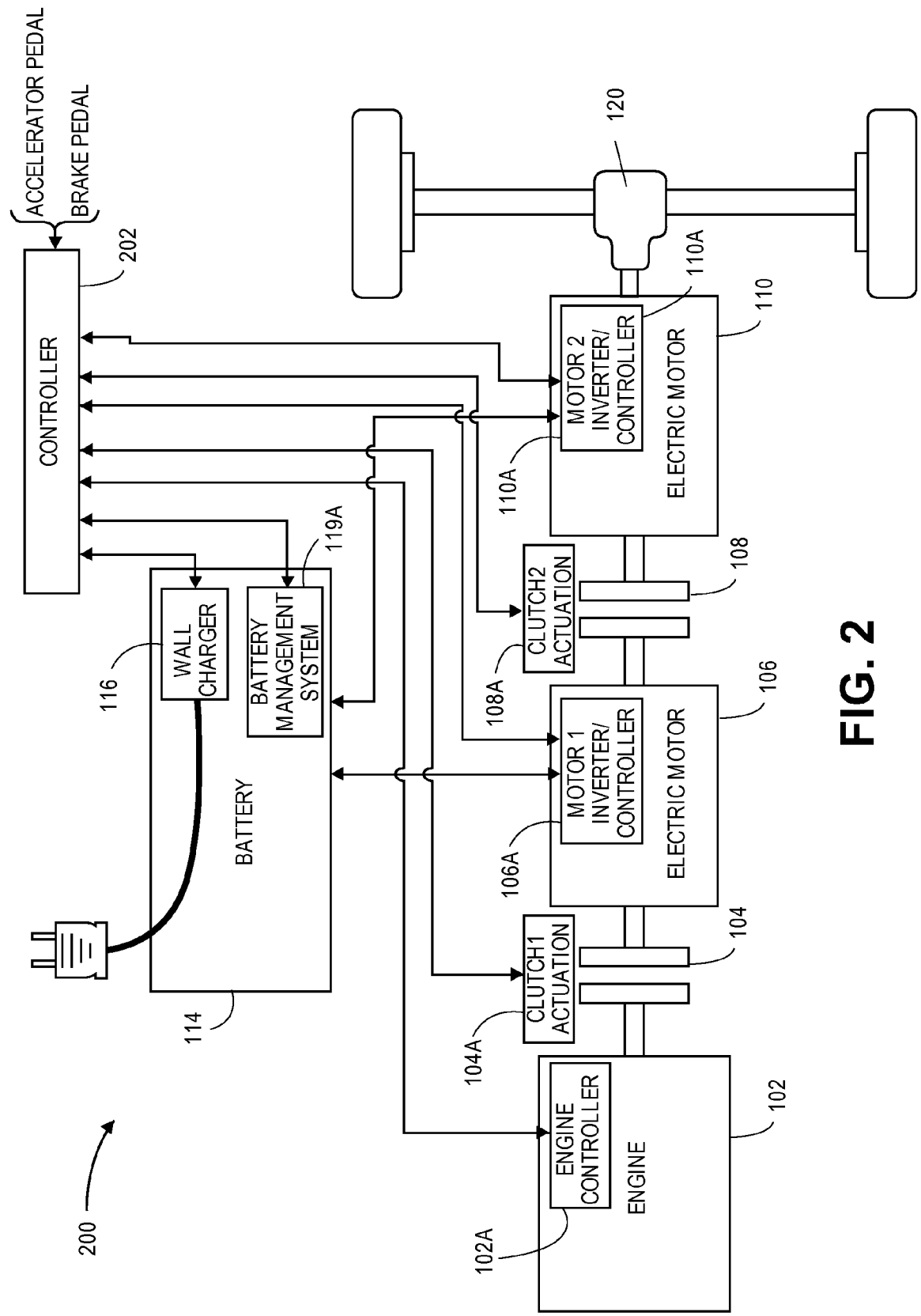
FIG. 2 shows one possible embodiment of an architecture of the powertrain of a HEV or PHEV vehicle as made according to the principles of the present application.

FIG. 2 depicts one embodiment of one possible control system 200 for a vehicle and/or powertrain made in accordance with the principles and/or design of FIG. 1. Controller 202 may comprise a suitable combination of hardware, firmware and/or software to input a number of system signals and output a number of control signals to affect the desired operation of vehicle 100. Signals may be input from sensors and/or actuators into controller 202 from a CAN bus architecture, as is known in the art. Possible signals input into controller 202 may comprise: speed of vehicle, speed of drive shaft, speed of crankshaft, state of charge (SOC) of the battery, driver demands via accelerator pedal and brake pedal actuation, clutch slip and other possible signals pertinent to the operation of the vehicle under a wide variety of possible conditions.

Other signals for the controller 202 may also include the following:
(1) Outside electric charger information, i.e., Level 1, 2, and other features such as time of charge, Grid to car, car to grid, Charge history, etc.
(2) Battery management system information such as State of Charge (SOC), Temperature of the pack and the individual cells, State of Health (SOH), SOC and temperature history, instantaneous power capability, fault code, contactor status, battery voltage and current, etc.

(3) Engine controller data, such as SOH, fuel use, speed, throttle, temperature, torque etc.
(4) Clutch 1 data such as, On/Off, clutch position, engine start/series operation, temperature, etc.
(5) Electric motor 1 (M1) data such as, Motor or generating, On/Off, speed, torque, temperature, voltage, current etc.
(6) Clutch 2 data such as, On/Off, position, pressure, M1+M2electric, Engine+M1+M2 parallel, Engine+M1 to M2 Series operation, temperature etc.
(7) Electric motor drive with M2 including data such as On/Off, speed, torque, temperature, voltage, current, one motor drive, 2 motor drive, series operation, parallel operation temperature, etc.

Other system signals and/or control signals may be connected to controller 202 via various interfaces and/or subsystem controllers, such as engine controller 102a, clutch actuations 104a and 108a, motor controllers 106a and 110a, and battery management system 114a. It may be appreciated that controller 202 may input other signals and send control signals from other sensors and/or actuators.

Embodiments of Operation Modes

With a vehicle/powertrain design similar to FIGS. 1 and 2, there are a number of possible modes of operation for HEV and PHEV vehicles, among these comprising:

(1) All Electric Mode (AEM)—where energy may be supplied by the batteries without regard from where the energy (e.g., on-board or off-board). This mode may affect a "charge depletion" policy, whereby it may be desired to provide as many "all electric" miles (e.g., according to some suitable metric or condition) before the PM is activated. AEM may be affected by one motor, or two motors operating—e.g., with energy from the battery pack.

(2) Prime Mover Mode 1 (PMM1)—where the vehicle may be powered substantially by the PM and the battery electrical energy may be used for performance boost. This mode may affect a "charge sustaining" policy, whereby electrical energy may be returned to the battery via the PM at a later time to provide for a substantial base of SOC in the battery. This mode may also be used to achieve temporary maximum speed where the power of the PM is added to the electric motors. Sustained maximum speed may be affected with the PM alone.

(3) Prime Mover Mode 2 (PMM2)—where electric motor 110 provides substantially all of the motive power and electric motor 106 provides electric energy to both drive the vehicle through motor 110 and to sustain the battery within a desired range of SOC. This mode may also affect a "charge sustaining" policy.

Figure 3A:
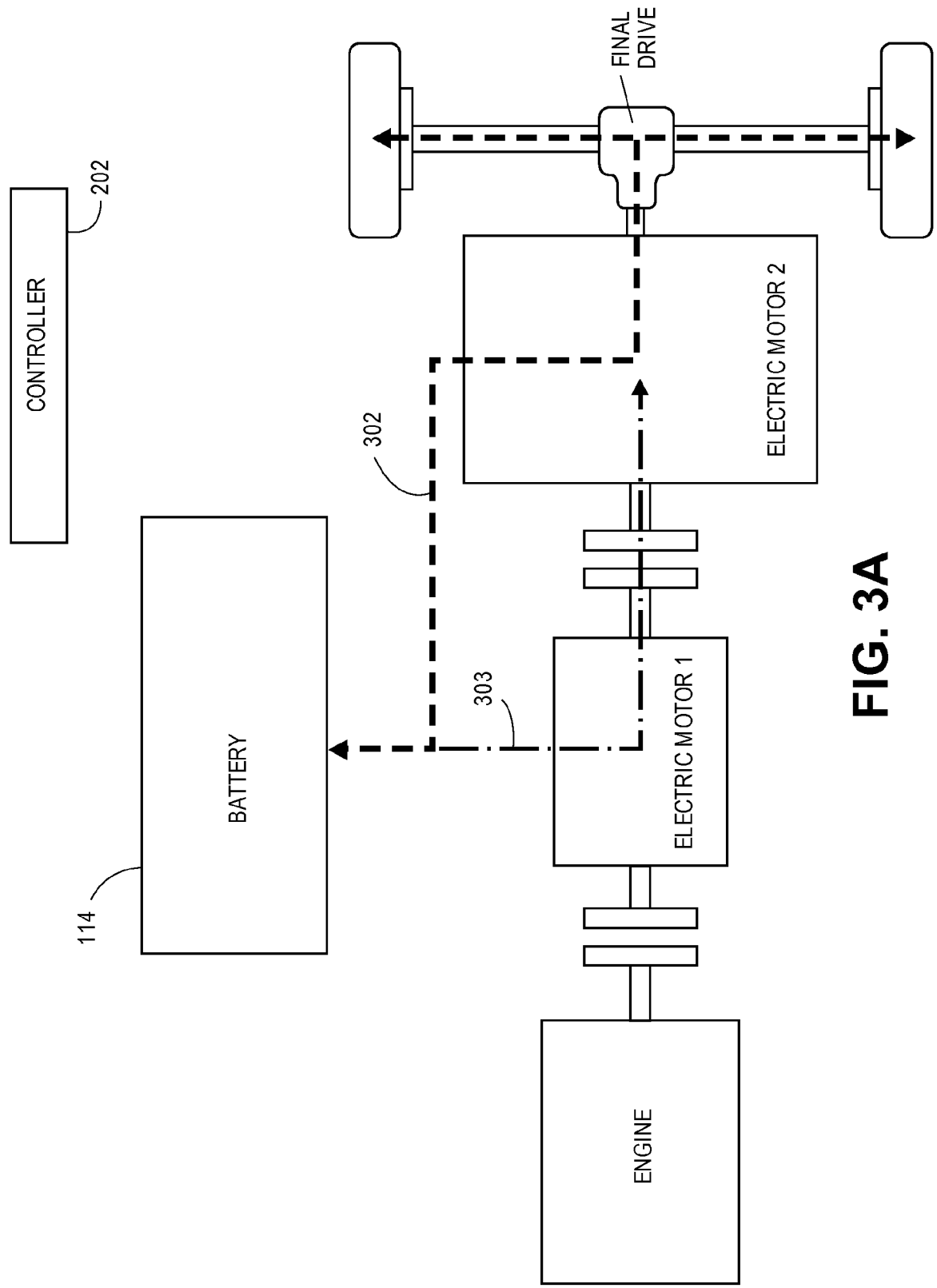
FIGS. 3A through 3C depict high level flow through the architecture of the powertrain in FIG. 2 to effect different modes of operation.
Figure 3B:
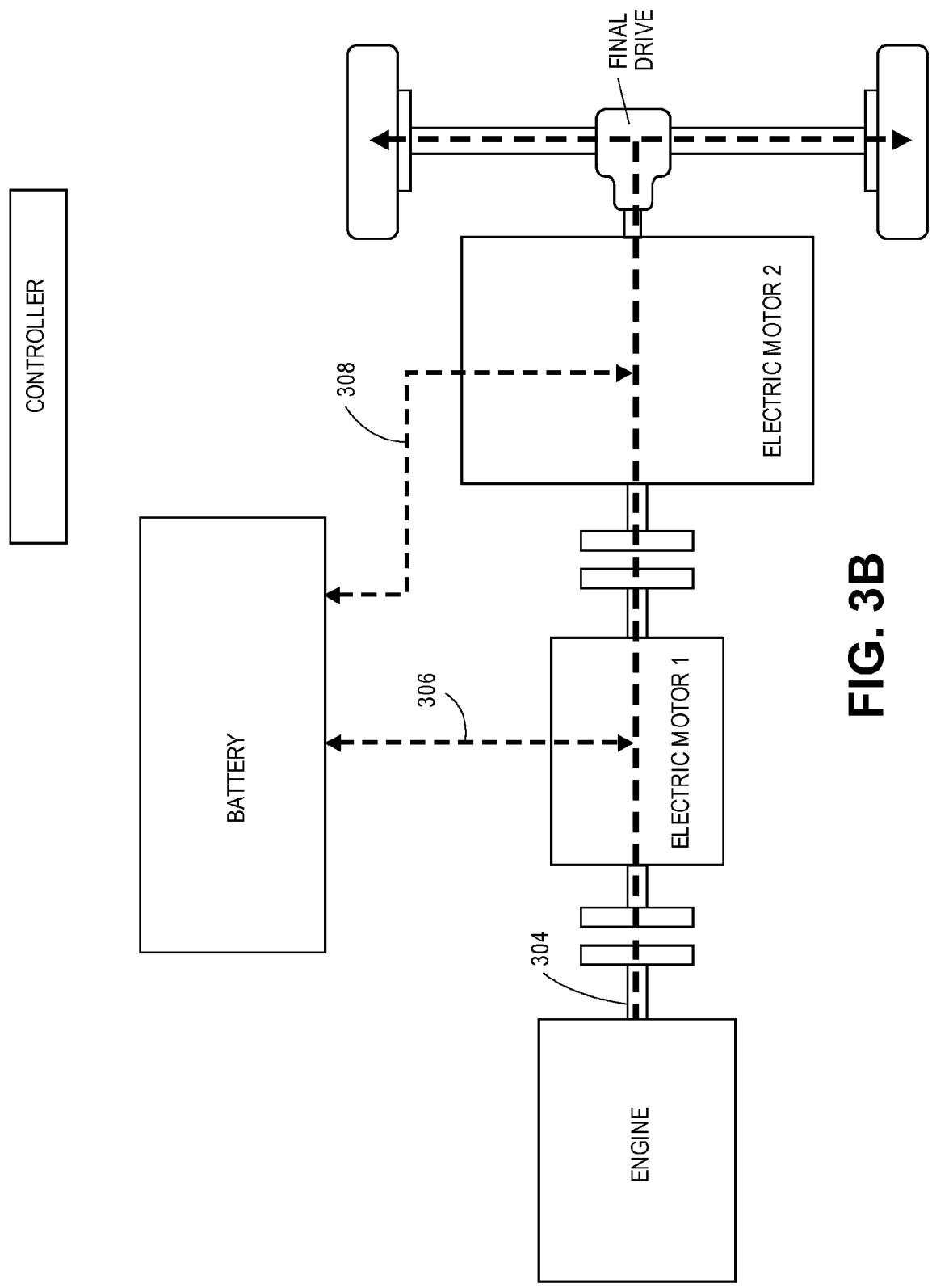
Figure 3C:
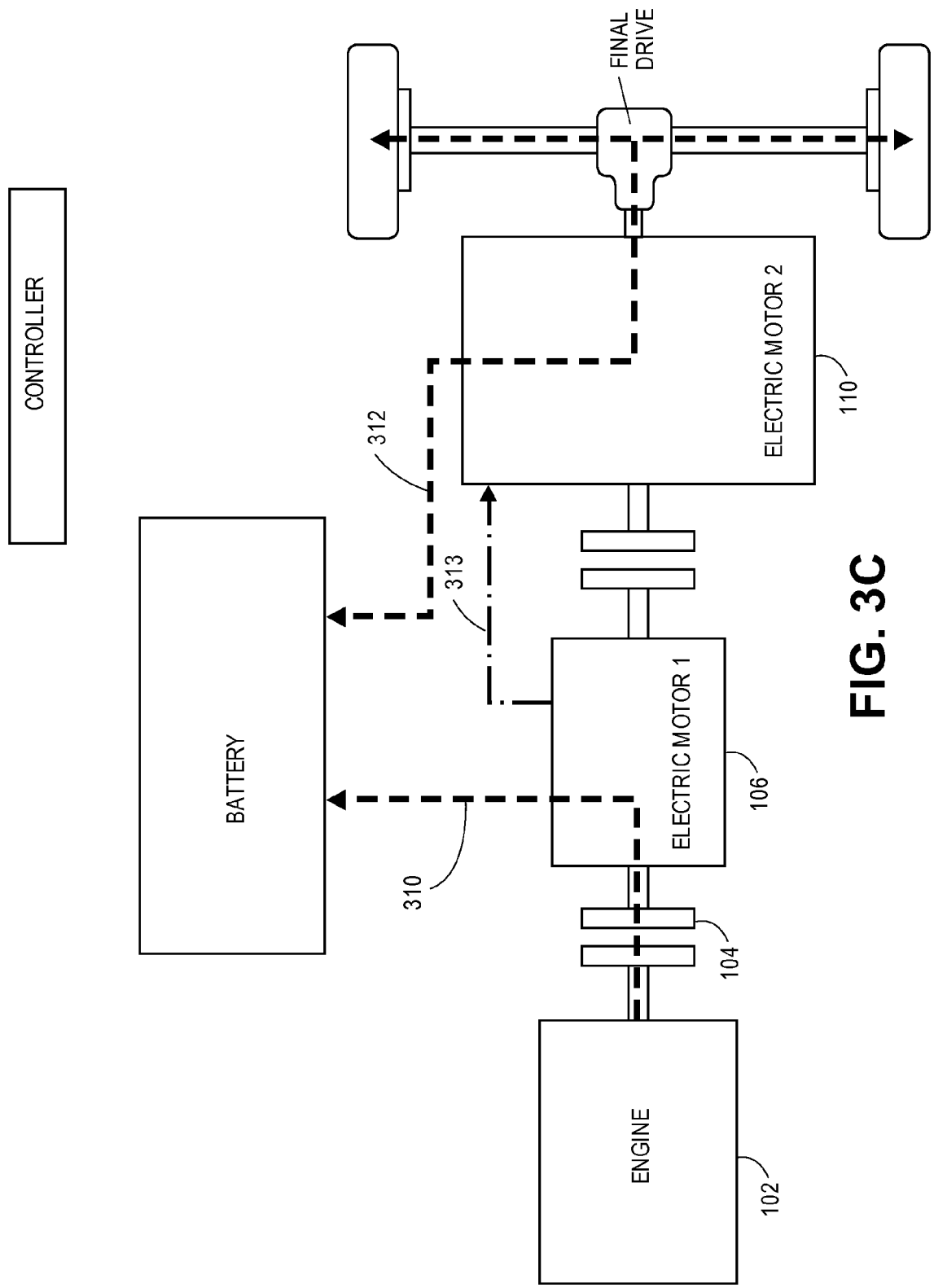

Although there are many possible intermediate modes that may be affected upon vehicle 100, FIGS. 3A through 3C depict the three modes enumerated above. FIG. 3A depicts AEM mode. In this mode, electric energy is transferred from battery 114 to either or both motor 110 and/or motor 106 under control signals sent from controller 202. Clutch 108 may be opened or closed as desired. The dashed line 302 depicts both the drive of the wheels—as well as possible regenerative braking by motor 110 (or, in some cases, by both motor 110 and motor 106, with clutch 108 engaged as needed). In AEM mode, clutch 104 may not be engaged—thus, engine 102 may remain in an OFF condition. Depending on desired conditions (such as driver demands of power and/or torque), motor 106 may be either ON or OFF condition, with clutch 108 appropriately engaged or disengaged (as depicted by the dotted-dashed line 303).

FIG. 3B depicts PMM1 mode. In this mode, both clutches 104 and 108 are engaged and engine 102 may be placed in the ON condition and provide motive power to the wheels. Motors 106 and/or 110 may be either in the ON or OFF condition, depending on the power and/or torque demanded by the driver, the SOC of the battery, or any other desired conditions monitored and/or policed by controller 202.

FIG. 3C depicts PMM2 mode. In this mode, clutch 104 may be engaged, while clutch 108 may be disengaged. While clutch 104 is engaged, engine 102 may be in the ON condition and driving motor 106 as a generator of electrical energy to be supplied to the battery (as denoted by dotted line 310). In addition, motor 110 may be in the ON condition and providing motive power to the wheels, depending on desired conditions affected by the controller.

In another embodiment, motor 106 may be driven by engine 102 and provide electrical energy directly to motor 110 (as denoted by dotted line 313) with clutch 108 open. This may be desirable when it is not possible or desired to convert the electrical energy of motor 106 into chemical energy in the battery.

During PMM2, the engine torque and speed may be designed to operate on an Ideal Operating Line (IOL) when operating or not at all. Controller 202 (or any other suitable controller) may determine which mode to operate under and when to switch to another mode, according to a set of desired conditions. In one embodiment, PMM2 mode may operate at any vehicle speed from zero to maximum AEM speed. AEM mode may be used from zero speed to some minimum threshold dependent on desired control rules. The maximum speed in AEM may not be as high as PMM1. In one embodiment, PMM1 may be operated above a threshold speed and used for highway travel and best fuel efficiency.

The accelerator pedal for a HEV or a PHEV needs to control the torque or power of the vehicle depending on the vehicle speed and the motor characteristics. The torque (T) desired and/or the power (P) desired by the driver may be determined by the electric motor and PM characteristics. Specifically, the corner speed where the constant torque characteristics meet the constant power characteristic is the curve which defines the electric motor and may be added to the PM torque-speed characteristics.

AEM Mode Embodiments

As mentioned above, the AEM mode may be desired for low speed, zero emission operation where substantially all motive power is from electricity. With a PHEV embodiment, this electrical energy may be obtained either off-board the vehicle (e.g., from the public or private electric grid) or from the electric generator on board—e.g., making electric energy from liquid fuel. It may be desired to use off-board electricity because it may be more efficient and provides electric energy with zero emissions from the vehicle. AEM mode may be affected in the configuration of FIG. 1 by using only motor 110 or by closing clutch 108 and using both motors 106 and 110 together with the clutch 104 in the open condition. With only motor 110 used, the clutch 108 may be open or closed, since motor 106 may be controlled to provide zero torque or power at all speeds.

In AEM mode, in the embodiment where final drive 120 comprises a differential (but not necessarily having another variable ratio transmission—e.g., automatic, CVT, etc., or the like), both motors 106 and 110 may be available for operation. At certain points in a given drive cycle, only motor 110 may be providing motive power to vehicle 100—especially at low speed conditions, and possibly up to a given efficiency of motor 110. However, if the driver demands more power and/or torque, or if drive conditions desire it, motor 106 may provide motive power at the same time as motor 110. In this situation, it may be desirable for controller 202 to operate motor 106 and motor 110 to be operated together at an efficiency better than either motor might alone.

In one embodiment, it may be desirable to have one or both motors operating substantially on their respective IOLs, as the vehicle operates. When there is no variable ratio transmission, then, with one motor, the vehicle may be controlled in the torque mode. If there are two motors in parallel, then one embodiment might favor that the particular torque demand may go to the motor with the best efficiency at that instant in time. This switching may take place substantially instantaneously, or with slight delay, by electronic control since the two motors are on the same or parallel shafts.

In the case when starting from a zero speed, vehicle 100 may be started in the AEM mode or—if engine 102 is running—controller 202 may add the engine torque by slipping the clutch while controlling the engine speed. Controller 202 may select the starting acceleration torque based upon driver demand via the accelerator pedal. For low accelerator pedal start, motor 106 may be used—especially if motor 106 is designed to be of lower torque and/or power specification than motor 110. In this case, clutch 108 should be closed. Thus, it is possible to launch the vehicle with either motor 106 or motor 110—or both motor 106 plus motor 110 (e.g. as a High-Torque/High-Traction Electric Mode). Such a High-Torque/High-Traction Electric mode may also be employed while the vehicle is at some non-zero speed and the drive has made a demand for additional power and/or torque, as desired.

Figure 4A:
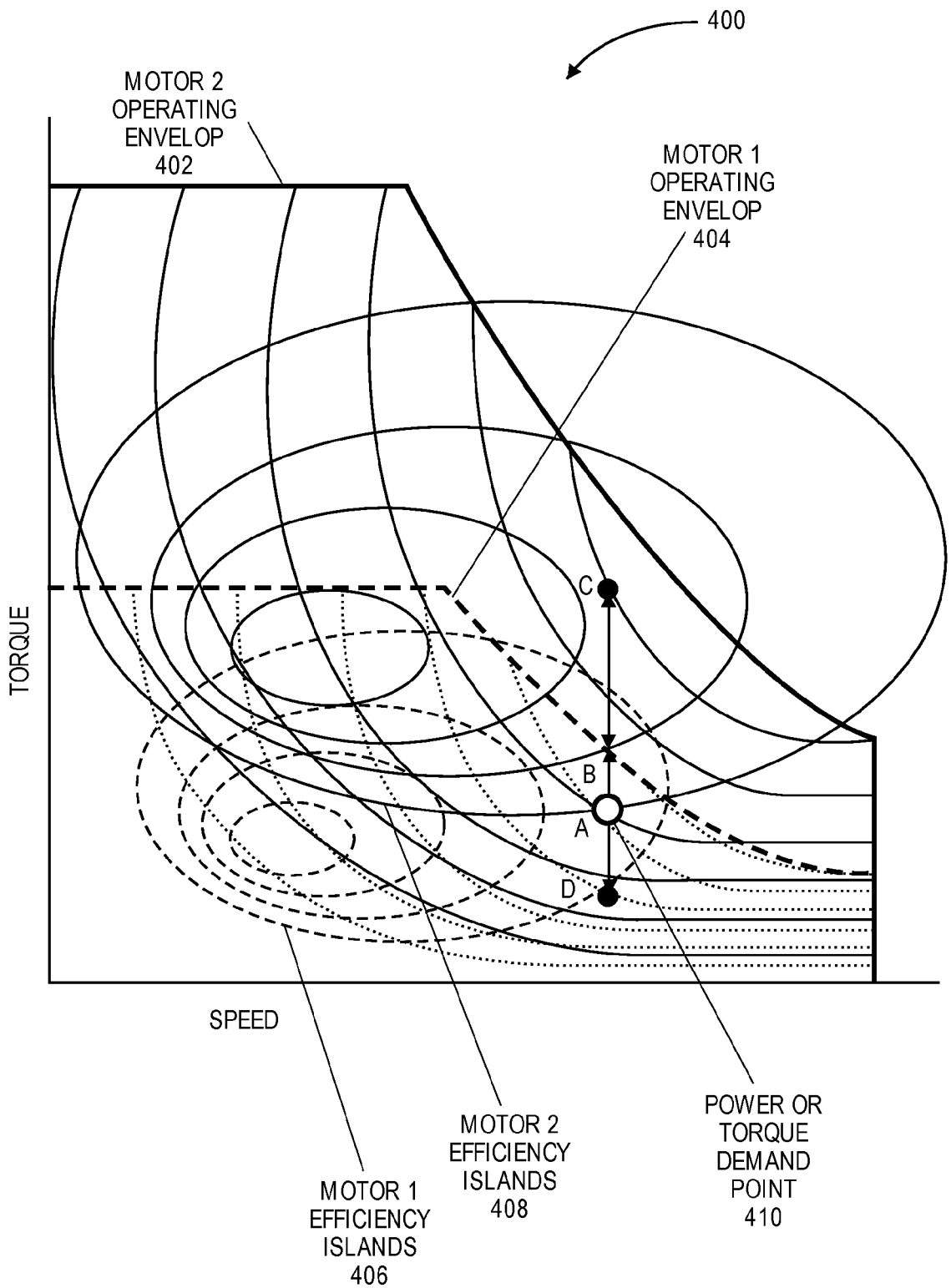
FIG. 4A depicts one possible set of operating envelope curves and efficiency islands for the electric motor-generators of the powertrain as architected in FIG. 2.

FIG. 4A shows one possible mapping 400 of both a small motor (as depicted in dashed lines 406) and a large motor (as depicted in solid lines 408) torque-speed characteristics. In addition, their respective envelopes for an exemplary vehicle are given as envelope curves 404 and 402, respectively.

Using this mapping, the relative efficiency of the vehicle may be determined by the instant power demanded and the instant power being supplied by motor 1 (106) and motor 2 (110). For example, in FIG. 4A, if the torque or power demand is as indicated by point 410, using either motor 1 or 2 may yield substantially identical efficiency. So at this point, either motor can be used. But if the operating point 410 was to occur higher in torque and/or power then, using motor 2 (110) may be preferable. If point 410 were lower in torque, then using motor 1 (106) may be preferable. The difference could be dramatic as the power or torque commanded becomes lower.

This may be further illustrated in FIG. 4A. Suppose Point A is a desired operating point commanded by the accelerator pedal, then if the accelerator pedal is further depressed to command the torque and power at Point B, then the Motor 1 may then be used, since Motor 1 is indicated as more efficient at that point. If the accelerator pedal is further depressed to power Point C then Motor 2 may be used—with Motor 1 set to zero torque because that configuration is indicated as more efficient at that point. It will be appreciated that—at some points of operation, it may be more efficient to use some combination of motive power from Motor 1 (M1) and Motor 2 (M2)—e.g. (a*M1)+(b*M2)—for better efficiency, where a and b are determined by the respective efficiencies of M1 and M2. Finally if the accelerator pedal is retracted to a power represented by Point D on the motor maps then only motor M1 is used, as it appears more efficient.

It will be appreciated that the motor efficiency information presented in FIG. 4A may be determined by motor specifications, testing or the like. This information may be provided to the controllers in various forms—for example, placed in Look-Up Tables (LUTs), or may be determined by modeling and calculation. In any embodiment, the motor efficiencies data may be provided to the controller to make such switching decisions, based on whatever performance metric desired.

In the embodiment where final drive comprises a variable ratio transmission (e.g. mechanical CVT, electronic CVT, automatic transmission, manual transmission, planetary gear set, or the like), then motor 110 may be controlled by controller 202 (or any other suitable controller in the system) to operate on its IOL at substantially all points in its operation. In such a vehicle configured with some variable ratio transmission, then control of the vehicle may proceed as described in U.S. Pat. Nos. (1) 5,842,534; (2) 6,054,844; (3) 6,116,363; (4) 6,809,429; (5) 6,847,189; (6) 6,931,850; (7) 7,217,205; (8) 7,261,672; (9) 7,713,166—all of which are hereby incorporated by reference in their entirety.

Figure 4B:
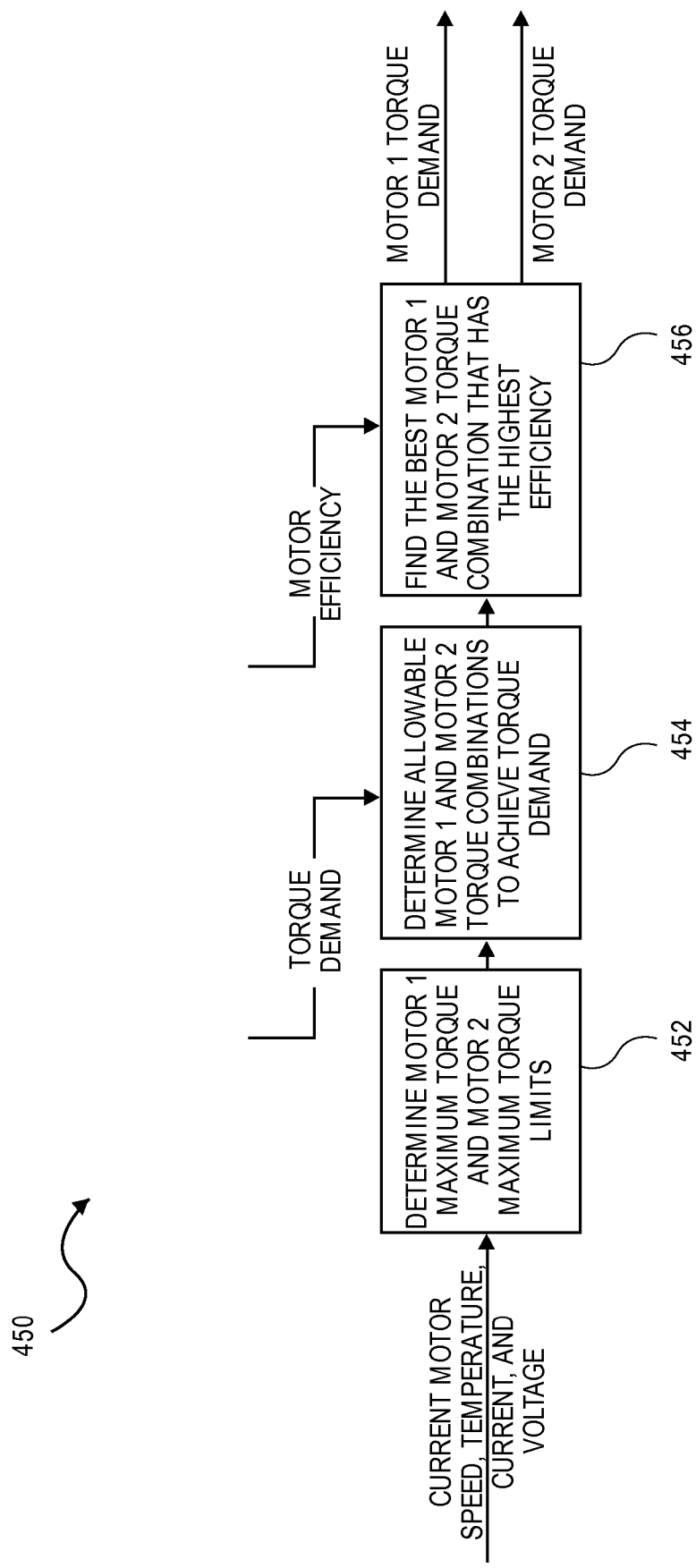
FIG. 4B depicts one possible embodiment for a control flow chart that employs the information depicted in FIG. 4A.

FIG. 4B gives one possible embodiment for a control algorithm/flow chart to operate a two-electric motor driven vehicle, such as shown in FIG. 2. It will be appreciated that this control algorithm may work with a pure EV vehicle having at least two electric motors—i.e., without an ICE/gas engine.

Control algorithm 450 may start at 452 by determining M1 and M2 maximum torque limits—and possibly, as well as the performance envelopes and efficiency islands. This information may be an encoding of the maps of FIG. 4A and stored into electronic storage that is accessible to one or more of the controllers/processors found in the powertrain—e.g., such as found in FIG. 2. As previously mentioned, each of those controllers may have accessible electronic storage and this information may be stored in any number of formats, including a Look Up Table (LUT) or determined by modeling and calculation—that encodes the motors' performance envelopes and/or efficiency islands.

The control algorithm may additionally adjust this information according to a number of sensor inputs, such as, current motor speed, temperature readings at various points (e.g., outside air temp, operating temp of M1, M2, engine, batteries or other places relevant to motor/vehicle efficiency), voltages, currents and the like.

At 454, the control algorithm may receive torque demands from whatever sources—e.g., accelerator pedal, brake pedal from a human driver, other torque demands from electronic sources or the like. These torque demand signals are input into processing module 454 and the module may determine the space of allowable M1 and M2 torque combinations/configuration that may satisfy the given torque demands.

Module 456 may then find the best M1 and M2 torque combinations that have the highest efficiencies (or satisfy some other desirable metric for the operation of the vehicle). This may be accomplished by traversing the space of allowable combinations and performing some min/max calculations—such as, traversing the efficiency maps and gradients found in FIG. 4A. Once a determination of best combination of M1 and M2 to satisfy the torque demand has been found, M1 and M2 torque demand signals may be sent to the associated controllers to achieve these respective torque demands.

PMM-Parallel Mode Embodiment

In the PMM parallel operation (as depicted FIG. 3B), clutch 104 and clutch 108 are both closed, and the engine and both motors may be all directly connected to the final drive ratio and wheels. In one embodiment, engine 102 may be controlled by controller 202 to be on its IOL, as it might also be so controlled in the PMM series mode described above.

To maintain the batteries, motor/generator 106 may be used to add the incremental power needed to maintain the battery SOC in a next time increment like 60 seconds—while motor 110 may be used to supplement the power of engine 102 for acceleration and power purposes. In one embodiment, since engine 102 may be directly connected to the final drive gear set driving the wheels of the car, it may not be desirable to affect this PMM parallel mode until a minimum threshold speed. Such a threshold speed may be set as a compromise in consideration of the fuel economy and performance and drive train smoothness. Depending upon the vehicle and its specification, in one embodiment, the threshold speed for this mode may be set at about 30 km/hr.

In many parts of the drive cycle, this mode may be more mechanically efficient than the PMM series mode since engine 102 is driving the wheels directly. However, in embodiments in which there is no transmission between the engine and the final drive, it may be desirable to throttle engine 102 to maintain the desired drive torque or power—thus possibly using more fuel to produce the power desired to drive the vehicle and maintain the batteries. In such a case, there may be a fuel efficiency difference between PMM series and PMM parallel modes. Controller 2020 may determine this difference by continuous monitoring of both modes. It may also be more efficient to throttle the engine 102 slightly than to put energy into the batteries and later take the energy back out.

In one embodiment, it may be desirable to set a policy to switch from Series to Parallel mode or visa versa—dependent on the most efficient operating condition over a period of time (e.g., the last 60 seconds). If controller 202 determines that the last 60 seconds could have used less fuel by being in the other mode, then controller 202 may switch modes for the next 60 seconds. To prevent cycling too frequently between modes, an optional time delay may be added.

PMM-Series Mode Embodiments

In the PMM-series operation (as depicted in FIG. 3C), clutch 108 is in the open condition, and motor 106 may be used as a generator to create electric power for the motor and to maintain the batteries within the desired range. Thus, clutch 108 may be used infrequently in the open condition. This strategy may allow the clutch throw-out bearing to be used infrequently. In addition, this may tend to increase its life as may be desired to meet vehicle durability requirements.

This condition would tend to occur if the batteries have been depleted by driving the vehicle to its minimum SOC and the vehicle is at a low speed (e.g., below 50 kph for example). In this case, the clutch 108 may be opened and the vehicle may be put into the series mode of operation or PMM2 where the power from the PM and generator M1 may be used to both charge the batteries and to power the vehicle. The division of power may be dependent on the commanded torque and the charging policy with the PM. Additional power may also be required for accessory loads etc. The PM may be operated on its IOL for generating the total required power at that instant. The recharging policy may depend on control policy for recharging set into the program of controller 202. In general, one possible policy might be to recharge to the upper limit of SOC at the slowest rate possible dependent on the demands of the driving style. In PMM2 or series mode, the vehicle speed may be zero to a maximum sustained by motor 110. In one embodiment, motor 110 may be controlled substantially as it might in AEM mode. The PM (e.g. engine 102) may be operated along its IOL and at the controller's command to provide the power demanded by the driver (e.g. by closing clutch 104)—as well as supply a power source to sustain the batteries, as shown in FIG. 3C.

In another embodiment, the controller may control engine 102 and motor 106 to charge the batteries at a suitable power in order to sustain a desired SOC in the battery during the current driving cycle. Thus, for example, the power being demanded by the driver/vehicle may be 50 kW at a particular instant in time, then the IC engine and generator may be set to produce 50 kw—plus an additional power increment desired to sustain the batteries in a period of time predetermined based on apriori known driving cycle measurements.

Continuing with this example, this period of time might be determined to be a minimum of 10 kW, for example, to fill the batteries to a high SOC in 60 seconds. Then engine 102 and motor/generator 106 may be set at 60 kW until the battery gets to a predetermined high SOC. If, however, this threshold is not achieved in a desired period of time, then the incremental power desired to maintain SOC in the next 60 seconds may be increased by a desired (e.g. proportional) amount—dependent on the error. In this way, the SOC may be automatically maintained, regardless of how the driver behaves and what the terrain or drive cycle demands.

In yet another embodiment, if the driver demand is determined by controller 202 to be unreasonable (e.g., if the driver is hard on the accelerator pedal and hard on the brake pedal and, possibly with a high cycle frequency—as might be sensed by the controller from a pedal deflection sensor), then there may be an indicator to the driver that more fuel is being consumed than may be desired. This indicator can be in the form of a bar chart or other proportional visual indicator showing that he is not anticipating traffic and wasting energy. In another embodiment, controller 202 may dynamically change the settings of accelerator pedal—to limit the acceleration rate and power being demanded instantaneously. This can be used as an economy mode for the vehicle—and such an economy mode might be selected by the driver to aid in conserving fuel. The difference in fuel consumption per km may be displayed as well—so that the driver may see in real time the difference in fuel consumption from such a selection.

Additional Dynamic Operational Mode Selection/Control

Figure 5B:
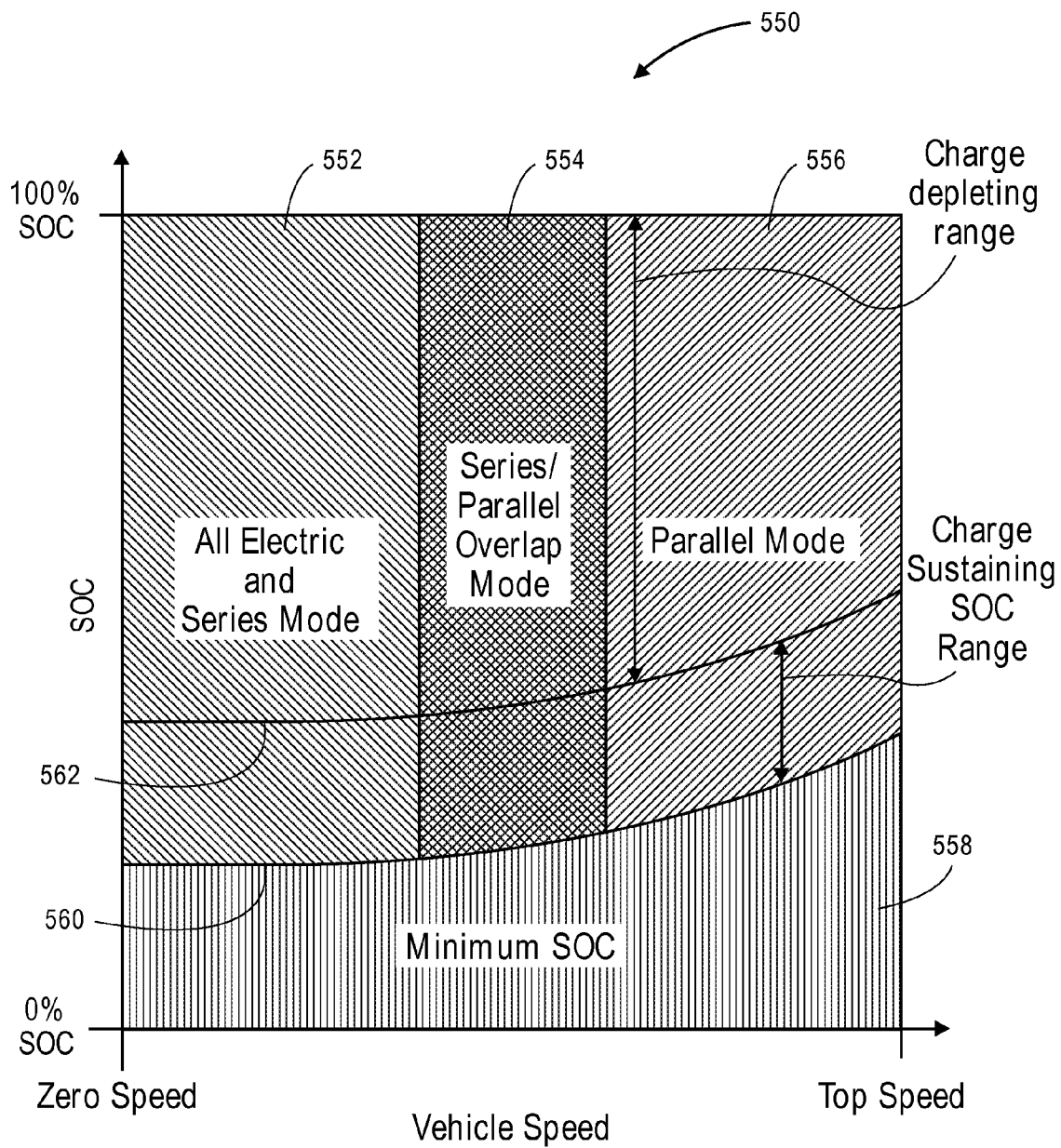

As noted above, AEM is one possible mode of operation for a pure EV having two or more electric motor drives, or a plug-in hybrid electric vehicle (PHEV), e.g., as shown in FIGS. 1 and 2. For a PHEV, the number of possible operational modes tends to increase, given the opportunity to employ a gas engine or other ICE for motive power. FIGS. 5A and 5B are two embodiments of a space of allowable operational modes of various vehicles as described herein. FIG. 5A depicts the space of operating modes on a State of Charge (SOC) vs. vehicle speed grid 500. As may be seen, if the SOC is substantially high enough, then the vehicle tends to use more of the electrical energy stored in the batteries (as opposed to other motive power, gas engine or the like).

This may be illustrated with an exemplary bar chart to the left of grid 500. As may be seen, if the system indicates that the SOC is high (i.e., at or above "SOC_high" threshold), then the system may tend to operate in a "charge depleting" mode. In this mode, the system may preferentially be operating in the AEM 502 (but may, for various conditions mentioned herein, operate in series, parallel or some other mode of operation). Alternatively, if the system indicates that the SOC is low (i.e., below "SOC_high" threshold), then the system may tend to operate in the "charge sustaining" mode. In this mode, the system may preferentially operate in Parallel Hybrid Mode 504, Series Hybrid Mode 506 or some combination of modes (but may, for various conditions, might operate in AEM, for perhaps a limited period of time).

It should be appreciated that, for the vehicle to preferentially operate in a charge depleting operational mode, the SOC is substantially at or above this SOC_high threshold as a first threshold. In addition, for the vehicle to preferentially operate in a charge sustaining operational mode, the SOC may be at or below the SOC_high threshold as a second threshold. This first threshold and second threshold may substantially the same threshold (i.e., SOC_high). However, in other embodiments, this first threshold and second threshold may be different values of SOC. This may be desirable from the standpoint of reducing a potential for toggling between operational modes for the vehicle. In other embodiments, the first threshold and the second threshold values may be functionally related to vehicle speed or other status of the vehicle (e.g., state of health of the battery, driver demands or the like)—as well as SOC of the batteries.

In addition, it may be seen that, at some point at sufficiently low SOC, the system may switch between AEM 502 and Parallel Hybrid Mode 504. At a lower point of SOC, the system may dynamically switch between Series Hybrid Mode 506 and Parallel Hybrid Mode 504. As indicated in FIG. 5A, the switching may occur depending upon the speed of the vehicle and, possibly, the SOC. Other switching conditions are also possible. For example, switching modes may also depend upon torque demand of the driver, traffic pattern, state of health of the battery, speed of the driveshaft or the like.

FIG. 5B is another embodiment of the possible space (550) of operating modes available to a suitable vehicle. As may be seen, space 550 may operate at low speeds/sufficiently high SOC in a combination of AEM and Series Mode 552. At higher speeds, the system may switch over to a combination of Series and Parallel Modes 554. At sufficiently high speeds, the system may preferentially operate in the Parallel Mode 556.

As may also be seen, there may be an envelope line 560 that determines a "Minimum SOC" region 558 below which the system may operate in a mode where the engine is ON and the system is seeking to add energy back into the batteries. This may limit the amount of switching between modes by the controller of the system. Above the Minimum SOC line, there may be another envelope line 562 that demarks between the "charge sustaining" region and the "charge depletion" mode. In the charge sustaining region, the system might tend to select modes that increase and/or preserve the energy in the battery. In the charge depletion mode, the system may tend to select modes that use the energy in the battery preferentially over the liquid fuel on board.

It may also be seen that the system may optionally increase the envelope lines upwards as speed increases. Thus, at higher speeds, the system may dynamically adjust the envelope lines that tend to make switching modes at higher SOC levels. This may be used to compensate for the higher rate of energy use at higher speeds of the vehicle.

One Embodiment

Figure 6:
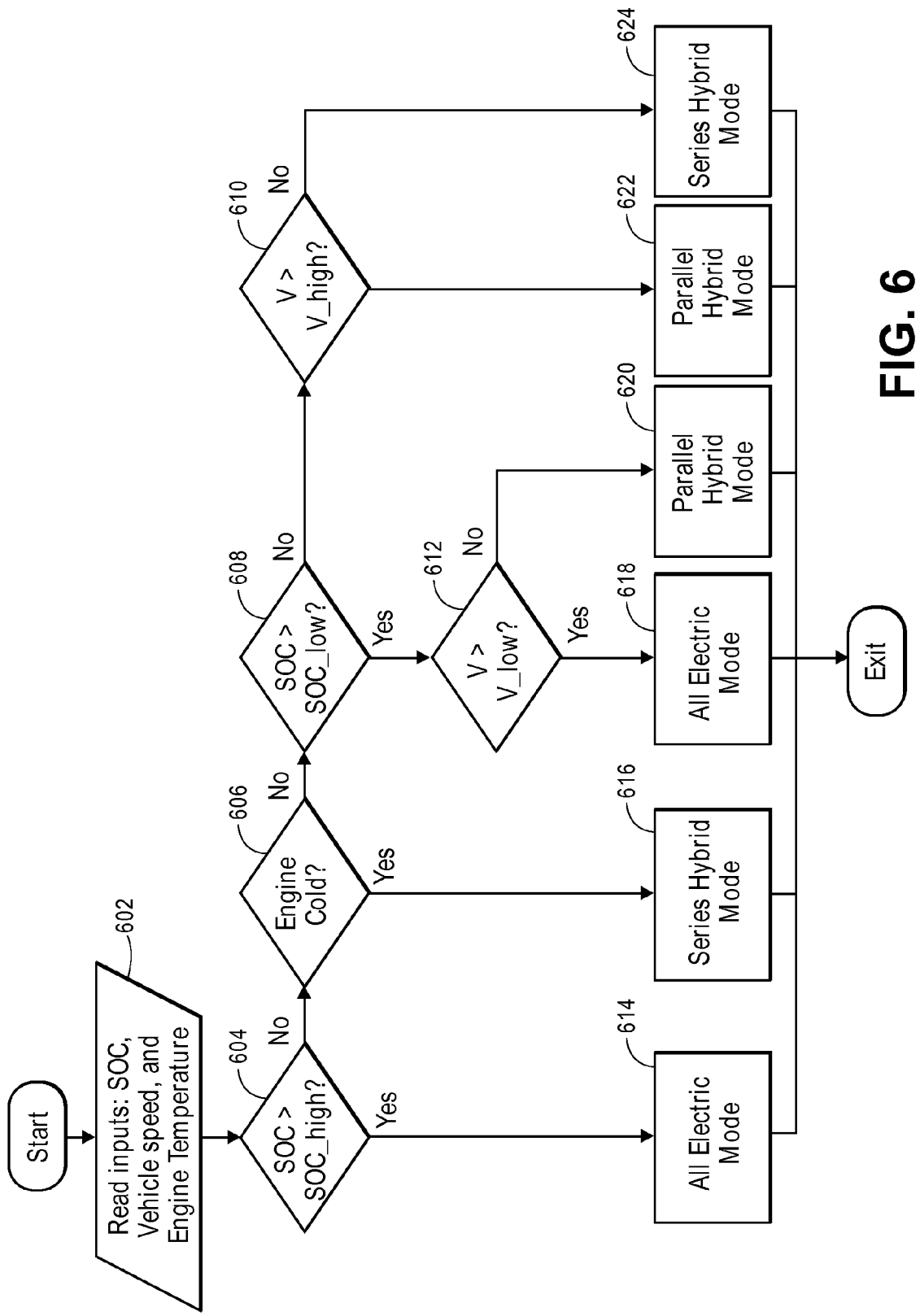
FIG. 6 is one possible embodiment of a control flow chart for a HEV and/or PHEV vehicle, as possibly architected, e.g., in FIG. 2.

FIG. 6 is one possible flowchart embodiment that affects a dynamic switching between operating modes as disclosed. It will be appreciated that there are other possible control algorithm implementations—e.g., to the previous FIGS. 5A and 5B—and that the present application encompasses all such suitable control algorithms.

At 602, the system and/or controllers may read all system inputs from sensors or the like as previously mentioned, including SOC, SOH, vehicle speed, engine temperature. At 604, the controller may make a determination as to whether the SOC is a sufficiently high level (e.g., SOC>SOC_high). If so, then, the system/controllers may select AEM 614 (or High-Traction electric mode, if desired). If not, a determination may be made at 606 as to whether the engine has a sufficiently high enough temperature. If so, then the system/controller may select Series Hybrid Mode 616. If not, then a determination may be made as to whether the SOC is above a minimum SOC (SOC>SOC_low)—and it may be possible to operate the vehicle in the PMM2 or series mode temporarily to warm the engine to its operating range. If so, then a determination may be made at 612 as to whether the speed of the vehicle is above a certain threshold. If so, then the system/controller may select AEM at 618. If not, then the system may select Parallel Hybrid Mode 620.

If the determination at 608 shows that the SOC is not at or above a threshold level, then another determination may be made at 610 that determines whether the speed of the vehicle is above a certain threshold. If so, then the system/controller may select Parallel Hybrid Mode 622. If not, then the system/controller may select Series Hybrid Mode 624.

It will be appreciated that the threshold values for the various conditions (e.g., SOC, vehicle speed) may vary themselves depending upon changing conditions of the vehicle.

Dynamic Operation/Mode Transition

Figure 7:
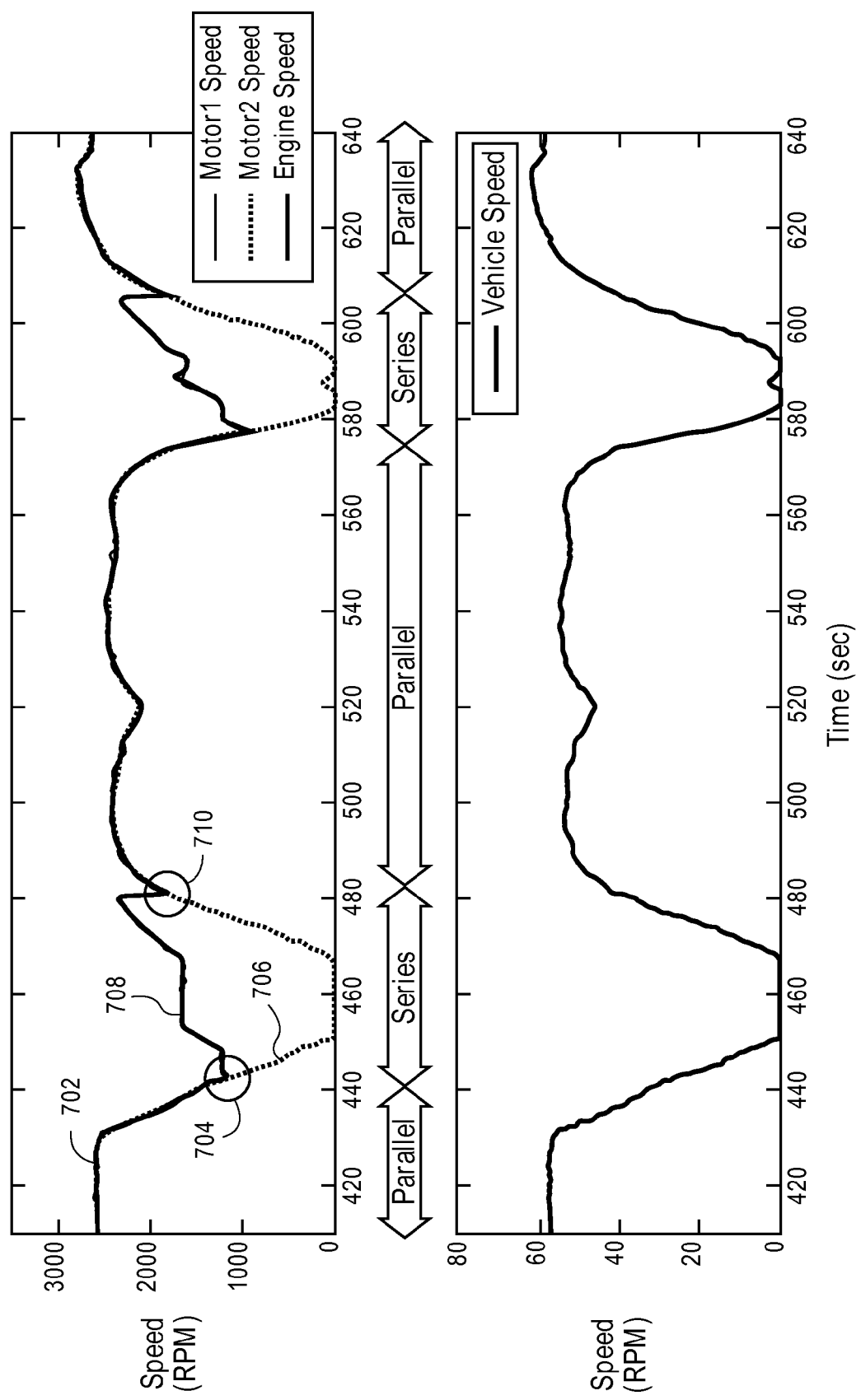
FIGS. 7 and 8 depict the dynamic operation of switching various modes for a HEV and/or PHEV vehicle made in accordance with the principles of the present application.
Figure 8:
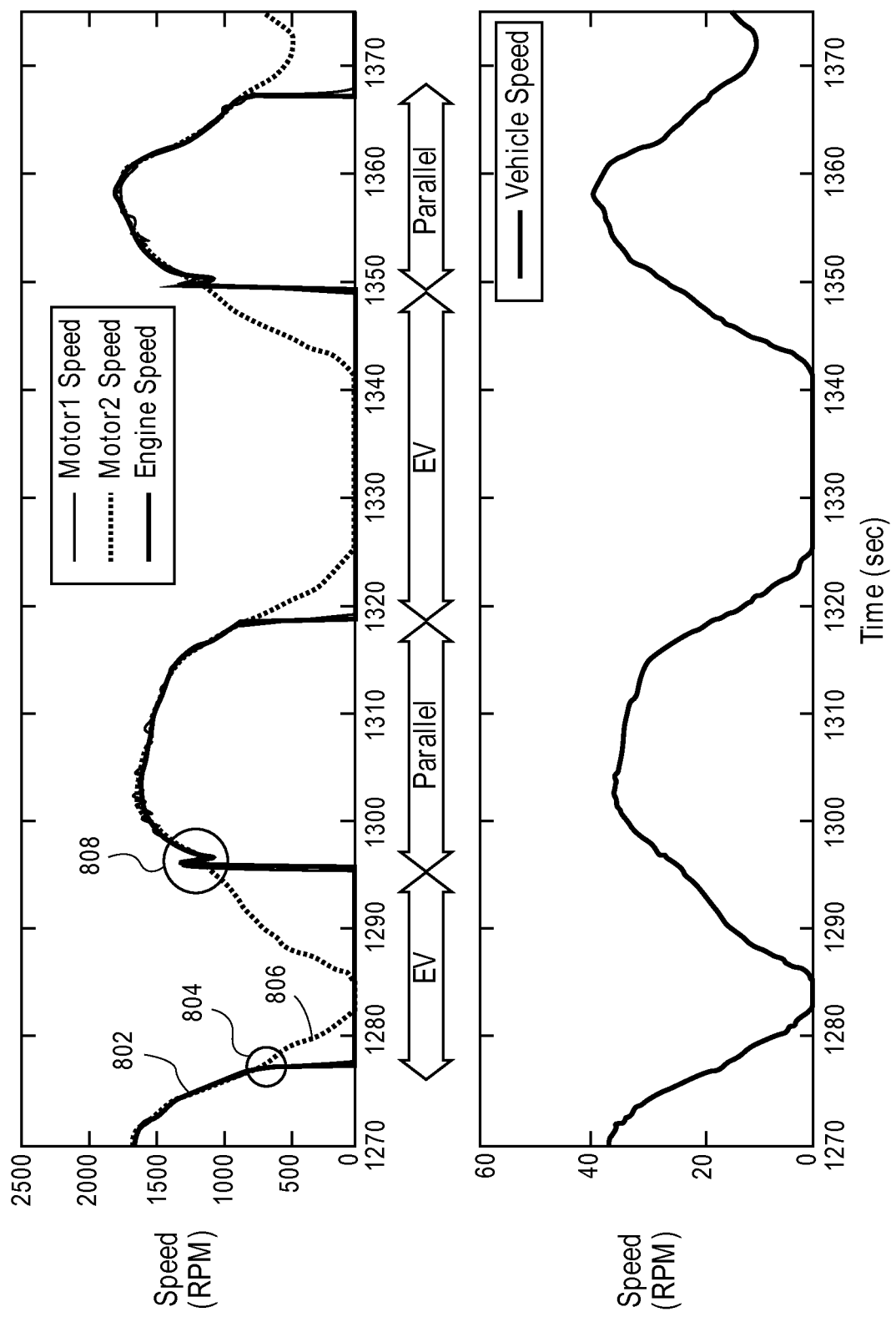

FIGS. 7 and 8 depict the two examples of the dynamic operation of the control algorithms as described herein. FIG. 7 shows one exemplary drive cycle with two plots. The upper plot shows the speed of Motor 1, Motor 2 and engine over a time slice. The lower plot shows the speed of the vehicle (as correlated with the RPM of the driveshaft) over the same time slice. The upper plot shows how one embodiment of the control algorithm matches and switches operating modes of the vehicle depending on the drive cycle.

At 702, during the time slice from zero to approximately 440 seconds, it may be seen that the controller selects Parallel Mode for the vehicle. During this time, the speed of Motor 1, Motor 2 and engine are matched, as they are running on the same driveshaft with both clutches closed. At point 704, the system/controller senses the user has commanded that the vehicle come to a stop. However, given the SOC or other suitable conditions, it may be desired that the system/controller switch to Series Mode between time 440 seconds to 480 seconds.

At this point, engine and Motor 1 may be de-clutched from Motor 2. Thus, engine and Motor 1 may continue along curve 708 to create electrical energy to be returned to the battery. At the same time, Motor 2 may continue along curve 706 to bring the vehicle to a stop or coast. At around time 470 seconds, it may be seen that the user has commanded the vehicle to speed up—and Motor 2 responds to bring the speed of the vehicle up. The PM (e.g. engine 102) with Motor 1 may be operated along its IOL to provide the power for Motor 2, as well as supply additional power to sustain the batteries.

At point 710, it may be seen that it is desirable for system/controller to switch to Parallel Mode at around 480 seconds. In this case, it is desirable to engage clutch 108 to bring engine and Motor 1 into engagement with the rest of the driveshaft to provide power directly to the wheels. It is desirable at this point, that the speed of the driveshaft coming off of Motor 1 to be substantially matched to the speed of the driveshaft starting at Motor 2. Thus, the speed of engine and Motor 1 are slowed to the point of the substantial match and clutch 108 is closed—for, e.g., smooth transition. For the remainder of FIG. 7, it may be seen that the system/controller operates and switches the operating modes of the vehicle in like fashion.

FIG. 8 is a similar exemplary drive cycle plot to that of FIG. 7. In FIG. 8, the system/controller is primarily switching between AEM (EV) Mode and Parallel Mode. As may be seen at 802, the vehicle is operating in Parallel Mode and the speeds of Motor 1, Motor 2 and engine are matched, as they are clutched into the main driveshaft. At point 804, the system/controller switches from Parallel Mode to AEM Mode at about 1277 seconds. As may be seen, clutch 108 is opened and the engine and Motor 1 are brought to zero speed (i.e. shut off). In the process, Motor 1 may be in active torque or speed control to reduce the engine shutdown vibration.

The vehicle may be driven by Motor 2 and at round second 1290 to 1296, the system/controller detects conditions (e.g., torque demand by the user) to warrant a switch to Parallel Mode. At point 808, it may be seen that the engine is started by Motor 1 with clutch 104 closed and clutch 108 opened. At this point, the speed of the engine and Motor 1 (as Motor 1 was de-clutched from the driveshaft) may be controlled to match the speed of Motor 2 (or the driveshaft). When the speeds are synchronized, clutch 108 is closed and the engine is available to provide torque to the driveshaft—with substantially no or little torque disturbance to the driveshaft.

Another Embodiment

Figure 9:
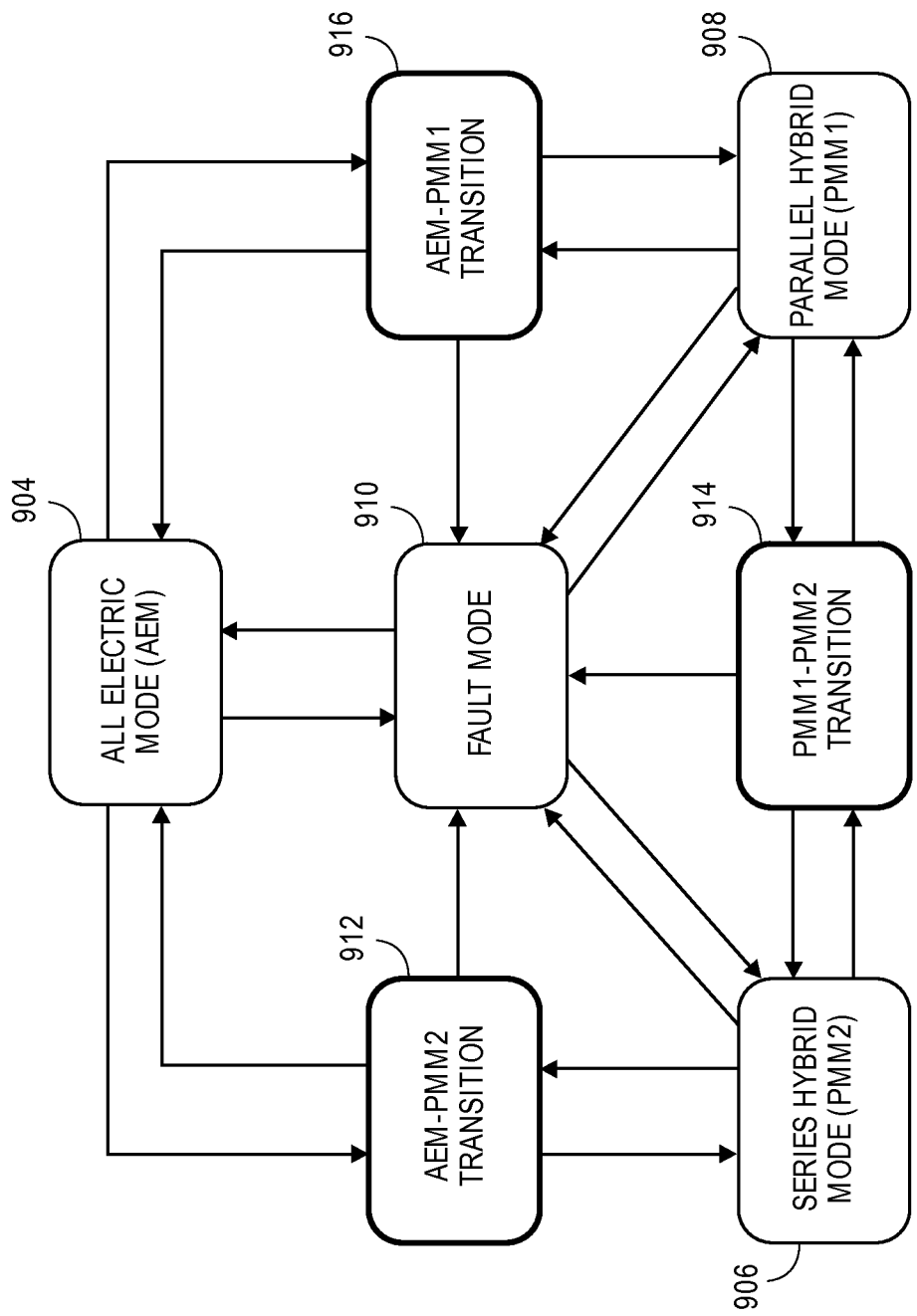
FIG. 9 is one possible embodiment of a state diagram for a mode transition flow chart.

In order to control the mode transition as shown in FIGS. 7 and 8, the controller may have algorithm to decide the mode actions and transitions. In one embodiment as shown in FIG. 9, the controller may have a state machine defining "permanent state (or mode)" of the hybrid powertrain such as all electric mode 904, series hybrid mode 906, parallel hybrid mode 908, and fault mode 910. The powertrain normally operate in one of these permanent modes until the mode transition triggered condition is detected and/or satisfied. The transition triggered condition from a source mode to a destination mode may be designed based on high level policy such as FIG. 5A, 5B or 6. Before the destination permanent mode is attained, the powertrain goes into a transition mode, such as AEM-PMM2 transition mode 912, PMM1-PMM2 transition mode 914, and AEM-PMM1 transition mode 916. The transition mode is a temporary mode in which the powertrain may be controlled or configured to support the transition into the destination mode operation. The transition is permitted only after faults and diagnostics based checks are completed, and the new powertrain mode request is satisfied. For example, the point 704 and point 710 of FIG. 7 correspond to parallel-series (PMM1-PMM2) transition mode 1014. The point 804 and point 808 of FIG. 8 correspond to all electric-parallel (AEM-PMM1) transition mode 916 of FIG. 9.

Fault Tolerance Strategy

In each of the powertrain mode, it is possible to affect a fault algorithm, implemented to detect whether the fault has happened while the vehicle is operating in that mode. FIG. 9 is one embodiment of a control algorithm/state diagram that affects fault tolerant processing. When a system fault is detected, the powertrain will transition to a fault mode 910 to continue the vehicle operation in a safe manner. The fault mode may force the powertrain to operate at a reduced level such as motor torque degradation. In some cases, the fault mode may force the powertrain to shut down completely if the fault severity is high and vehicle is not allowed to drive. When the fault condition is cleared, the powertrain may be allowed to transition back to the appropriate permanent modes (904, 906, and 908). One possible fault tolerance design is that if the system operates in the transition mode (912, 914, or 916) and the transition time exceeds a predefined threshold before entering the destination mode due to component degradation, the system state will move to fault mode 910. The system may stay in the fault mode or transition back to the source mode depending on the fault severity.

It will be appreciated that other conditions may exist in order for the system to exhibit fault mode processing. The following are other such conditions/fault examples:

Fault Example 1. If motor temperature sensor feedback is not abnormal (e.g., out of range fault), the system may enter the fault mode operation 910. In this mode, the motor torque may be significantly reduced and a warning may be provided to the driver.

Fault Example 2. In series mode (PMM2) 906, if the system detects the Motor1 is not in generation (e.g., due to Motor1 malfunction or Engine malfunction), the series mode may be terminated and fault mode may be entered. The fault mode may shut down the engine and continue to operate the vehicle in only electric driving by Motor2. The system may be allowed to resume the all electric mode 904 for normal operation if the fault condition has been cleared.

Fault Example 3. If a clutch position cannot be confirmed from the sensor (e.g., due to sensor malfunction), the system may enter the fault mode 910. In the fault mode, only Motor2 may be used to drive the vehicle. No clutch actuation may be allowed.

Advanced Battery Management Embodiment

In another aspect of the present application, it may be desirable to add suitable battery management to increase the life and performance of the batteries. While most batteries supplied by battery manufacturers typically include a Battery Management Systems (BMS) 119A, these BMS do not manage the batteries sufficiently and/or optimally for HEV/PHEV vehicle use. Thus, a typical BMS may provide information to a higher level controller (e.g. controller 202) and depend on that controller for further control of secondary factors such as the efficient use of electric energy and maintenance of proper battery use. Such additional control system—the Battery Monitor and Maintenance System (BMMS), may be affected by controller 202 as depicted in FIG. 1.

In one embodiment of a BMMS, as made in accordance with the principles of the present application, when discharging the battery pack to produce power demanded by the vehicle and the driver, it may be desirable to supply the power demanded when driving the vehicle in either the AEM or PMM (e.g., PMM1 and/or PMM2) modes to maximize electric energy usage, subject to promoting the healthy use of the battery to prolong battery life. If the battery system has a limit on power and/or current available (as may be determined by the BMMS—which considers the battery SOC), the temperature and temperature distribution, the age of the battery and other parameters may be considered by the BMMS (and/or controller 202). The BMMS and/or controller 202 may limit the power and/or current performance to keep the battery from being suddenly negatively impacted. Such negative impact may occur at vehicle start up, for example. In such a case, controller 202 may actively control the battery current output and thus the electric motor output. In this embodiment, this may affect a reduced performance from what may be possible if no such limit is imposed. However, this performance limit will be translated into longer battery life and greater electric range in the vehicle driving in either the AEM or PMM modes.

It is known that all batteries have an internal resistance where the loss in the battery pack results in heat to the battery pack. But the loss is proportional to $I^2 \times R$—where I is the battery current and R is its instantaneous internal resistance. This battery internal resistance tends to vary as a function of battery type, SOC, temperature, age, etc. Thus, in one embodiment, the BMMS may regulate the discharge of the battery pack, according to the battery state of health (SOH), state of charge (SOC), temperature and other factors—as may be desirable to affect the longevity of the battery pack.

In addition, during the recharge of the battery in the vehicle by the vehicle's main PM (such as engine 102, fuel cell), or other power generation device, or the vehicle's kinetic energy during regenerative braking, the BMMS and/or controller 202 may determine the maximum current to satisfy the power needed to maintain the driveline energy demand and to charge the battery pack at a minimum current sufficiently to replenish the charge taken out by a given driving event. Such a driving event may be occur over a given period of time—e.g., over the last "X" seconds, where X may be a function of the driving event, such as congested city highway or mountain driving. This recharge current limit may be determined by the driving characteristics of the driver as well and the vehicle environmental conditions such as traffic conditions, ambient temperature, etc.

Figure 10:
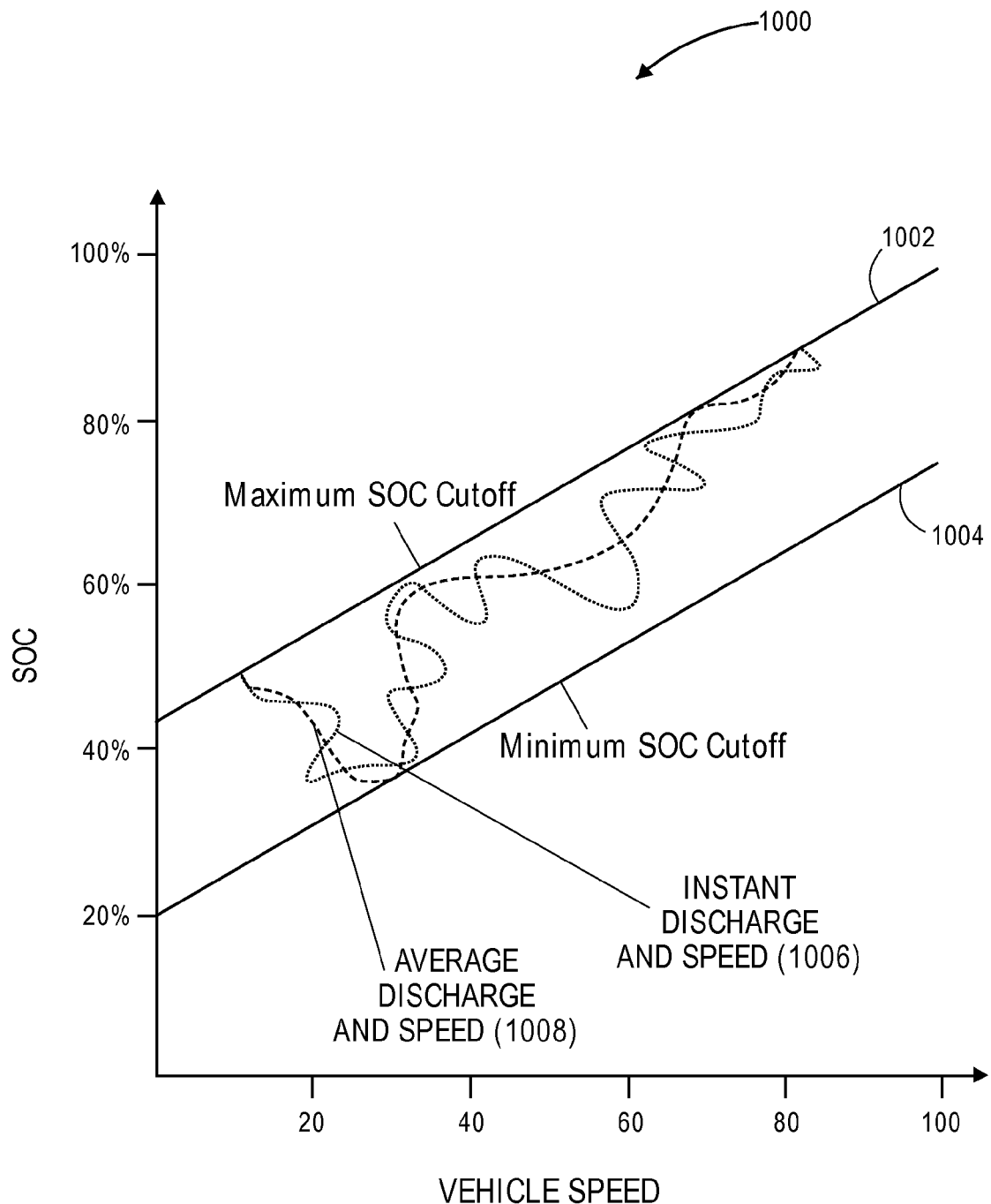
FIGS. 10 through 12 depict various embodiments of advanced control operations designed to improve battery performance and lifetime.

In one embodiment, a control program may be embedded into BMMS controller. FIG. 10 is one embodiment of an advanced battery management control policy. FIG. 10 shows a grid of SOC versus Vehicle Speed and therein is shown an exemplary drive cycle which results in an instant discharge and speed curve 1006. An average discharge and speed curve 1008 is derived from curve 1006 and plotted alongside.

This drive cycle is managed and/or controlled to between two SOC values—i.e., a Maximum SOC cutoff envelope curve 1002 and a Minimum SOC cutoff curve 1004. Merely for the sake of exposition, curves 1002 and 1004 are depicted as straight lines, but it should be appreciated that other envelope curves are possible. FIG. 10 depicts that—when discharging the batteries (i.e., when going from the high state of charge limit toward the low state of charge limit line) that the average vehicle speed was low and when charging the batteries the vehicle speed was higher. This is not always the case but is used to distinguish taking energy out of the batteries and putting energy back into the batteries. These conditions may be around the same speed for example. The speed separation is to clarify the concepts. The trajectory line shows the battery charging and discharging along with a variation in vehicle speed. The green lines are the average trajectory in discharge or charge. It should be noted that the trajectory on discharge may be shorter in time than charging because it may be desirable to charge as slowly as possible to greatly increase charge efficiency as well as reducing battery heating and increasing battery health. The length of time for charging may be maximized by the BMMS. FIG. 10 further shows that the threshold may be a function of vehicle speed since the energy required to drive a vehicle is a function of vehicle speed.

The Upper SOC threshold 1002 and lower SOC threshold 1004 may be lines or curves that may be functions of vehicle speed and other parameters. Currently, hybrid vehicles tend to keep the battery high SOC and low SOC independent of speed. In one embodiment, the BMMS affects a curve or other dependence relationship between these thresholds. In another embodiment, the BMMS may affect a curve or other dependence relationship between: (1) the high SOC threshold and vehicle speed and (2) a different relationship between the low SOC threshold and vehicle speed. These relations may be determined by the needs of the vehicle and the battery pack. The curves will be different for the range of vehicle and battery size combinations and it may also depend on the applications as well as potential driver demands.

Embodiment Based on Driver Characteristics

Driver demand may be measured by the driver's accelerator and brake pedal activity. It would be desirable to capture this information to feedback into the BMMS. In one embodiment, this may be done by measuring the average accelerator and brake pedal motion and the second moment of these pedal positions to judge the activity excursions and frequency. This data will be used to determine the aggressiveness of the driver. Since the energy required to drive a particular vehicle speed profile tends to be proportional to the activity of the driver, this statistical information may be used to judge energy consumption per given vehicle distance or vehicle energy efficiency.

This information may be compared to a "standard" or controlled tested conditions and, in one embodiment, an indicator with a time history record may be displayed to the driver to provide the driver feedback on more appropriate ways to drive. An indication of the improvement possible will be provided the driver to encourage him to minimize the variance of the accelerator and brake pedals thus decreasing his electrical consumption and increasing his electric range and vehicle efficiency.

In addition, this information may be used to set the range of variation and average State of Charge (SOC) of the battery pack. In one embodiment, the more aggressively and frequently the accelerator pedal and Brake pedal are used, the higher the Minimum SOC threshold may be set—in order to prevent the battery SOC from going too low while driving. This may be due to a need to satisfy the demand of the road or other overriding conditions which allow temporary reduction of the battery SOC beyond the lower boundary. One such example may be allowing the lower boundary to be crossed if the accelerator pedal is depressed to the limit for more than a first period of time (e.g., 5 seconds or the like)—e.g., meaning that the driver is demanding high power consistently for this period of time and therefore may desire serious maneuver requiring full power of the vehicle. Beyond this first period of time, the power may be reduced with a degradation policy that does not jeopardize safety but protects the battery, as will be discussed in regards to FIG. 11 herein.

In another embodiment, the BMMS may also be used to inform the system when to change modes from AEM (e.g., from charge depletion) to Series or parallel PMM (e.g., to charge sustaining)—and vice versa. Since the average vehicle speed may be one determinant of energy use over time, then that information, in combination with the accelerator pedal demand, may determine the power used. In one embodiment, it may be possible to use speed and accelerator pedal and brake pedal demand as an input that may be used to determine the power needed and energy needed over a specified period of time—assuming that the future activity will have the same statistics in the road load and the driver behavior.

With this information, it may be possible to predict or estimate what the future time period (e.g., next ten (10) seconds or the like) may be. One policy may be to assume the same maximum power and energy use as the last ten (10)

seconds or any other suitable time period. It should be appreciated that other policies may be used as well. For example, the time of prediction and time of data collection need not be the same. Once the predicted value of charging current is determined, then the engine and generator power level may be determined. If this level of current is too high for the current condition of the battery (determined by the temperature, state of charge, state of health, etc., of the battery), then the performance of the vehicle may be limited by the vehicle controller. In the case of pure EVs, all vehicles driven by only by a battery pack, may have limited performance at some point. The BMMS may limit the performance prematurely to protect the batteries and provide the longest expected range on battery alone.

One Embodiment

Figure 11:
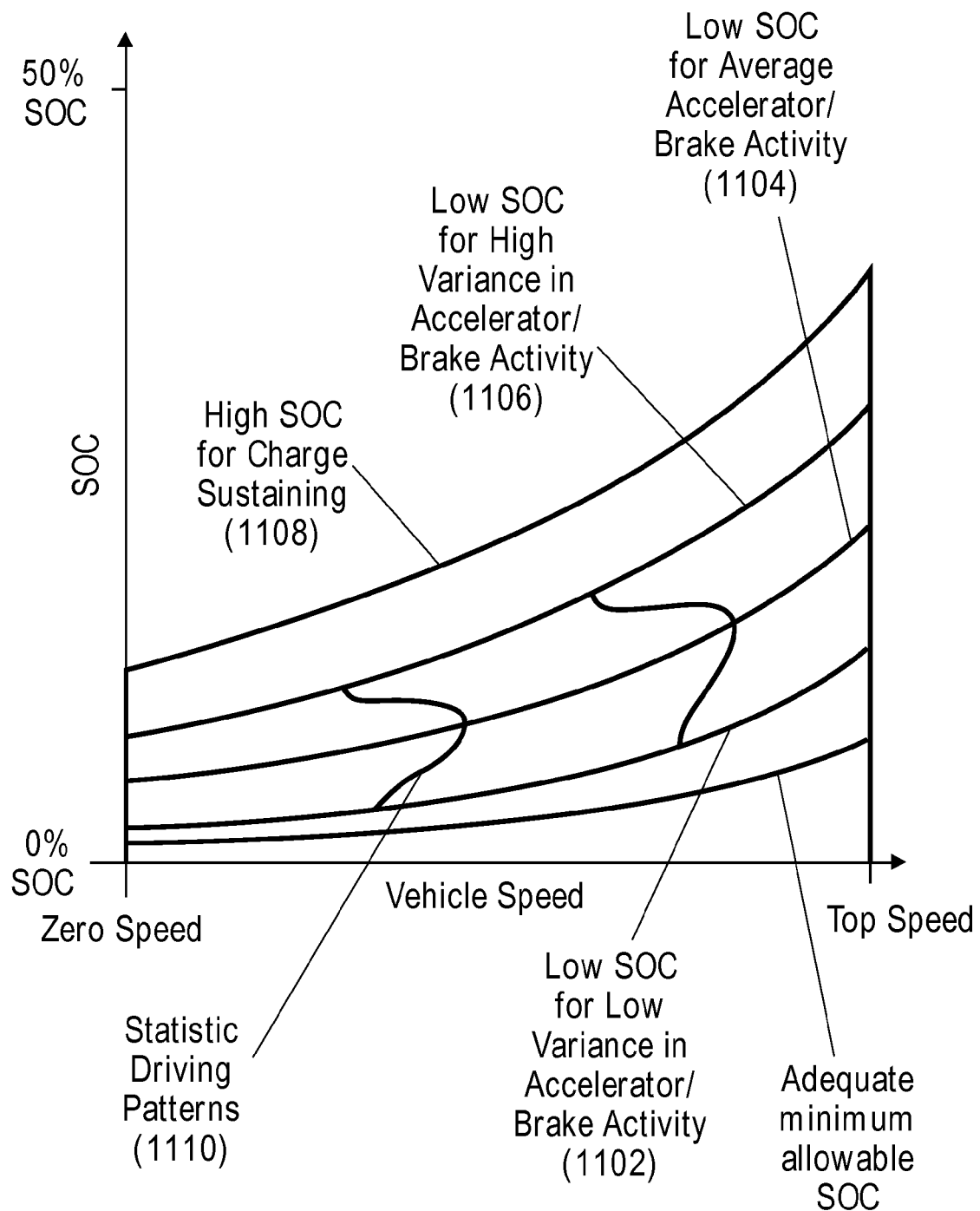

FIG. 11 depicts one embodiment of a dynamic BMMS control policy as made in accordance with the principles of the present application.

FIG. 11 is a mapping of vehicle speed versus SOC. As may be seen, the BMMS module may dynamically select among several curves for HIGH SOC or LOW SOC thresholds. In one embodiment, the BMMS may set such charge and discharge limits according to the battery needs and not the vehicle needs. The driver may not be able to distinguish the difference, but the battery may be better protected.

At the bottom of this plot in FIG. 11, there may be an optional, suitable Adequate Minimum Allowable SOC—below which the BMMS would not let the battery drain. If this is included in the BMMS, then it may be determined by a number of factors—e.g., battery specifications, warranty considerations or the like. Other curves that may be affected are: a HIGH SOC threshold (1108) for charge sustaining purposes, a LOW SOC for HIGH variance in accelerator and/or brake activity (1106), a LOW SOC for AVERAGE accelerator and/or brake activity (1104), and a LOW SOC for LOW variance in accelerator and/or brake activity (1102). As mentioned, these curves may be selected according to the driver's accelerator and/or brake activity and whatever relevant statistics that may be discerned (e.g., 1110).

The BMMS may determine that low speed creeping in the AEM mode may deplete the batteries to a minimum SOC boundary—and then the powertrain system should switch to the PMM or series or parallel mode. To determine the appropriate SOC for a given vehicle speed, driver activity, average and standard distribution of speed may be measured and/or calculated. In one embodiment, it is possible to set the LOW SOC as low as possible depending on these data. For example, if the average speed is below a certain speed (e.g., 30 kph) and the speed variance is also small, then the SOC may be set to this minimum allowed by battery durability and projected vehicle instant power and energy considerations. But if the speed variance is high indicating serious stop and go traffic then the LOW SOC boundary should be set to higher value to allow the use of higher power for a longer period of time. This may occur in heavy traffic highway driving for example.

When the vehicle is in charge sustaining or PMM in either series or parallel mode, the charge rate may be set to a minimum as determined by the vehicle conditions and battery characteristics discussed above. As discussed, this charge rate may be dependent upon the vehicle activity and the driver's activity. Statistical information may be used to determine both the charge rate and the average and delta SOC for the battery pack. It may be desirable to set the maximum SOC line and minimum SOC lines and the nominal SOC or medium SOC as a function of vehicle speed. Then depending on the driving statistics the HIGH SOC and LOW SOC lines may be modified by the statistics to be narrower. This narrowness may lead to better maintenance of the batteries and exercises the batteries over a shorter range thus increasing life.

One Example

Figure 12:
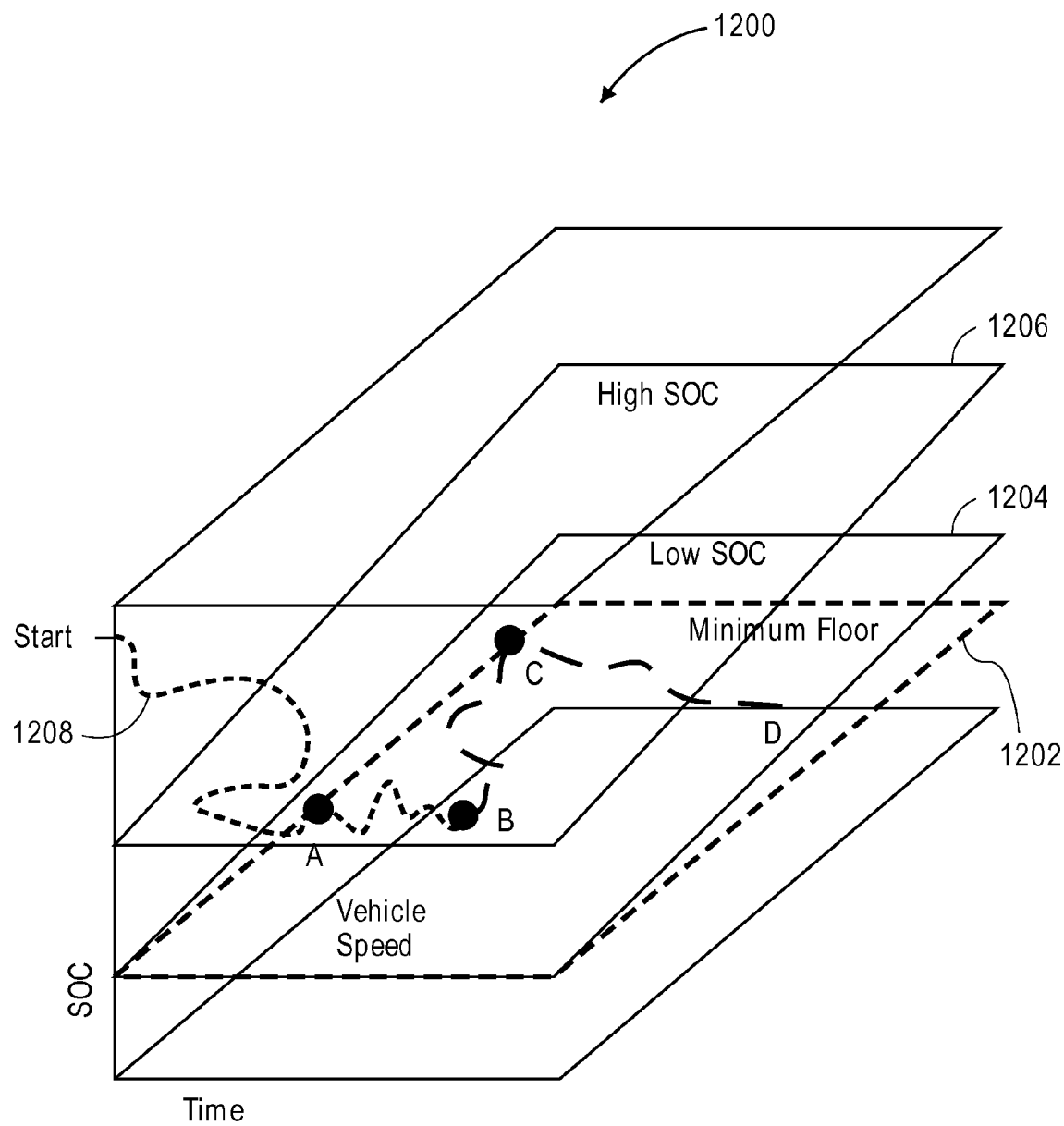

FIG. 12 depicts one exemplary drive cycle and the control of the battery's SOC as a function vehicle velocity and time. FIG. 12 helps to explain BMMS control and mode switching. The vehicle modes depicted herein are AEM (or Charge Depletion)—in which the battery may be regenerated with braking the vehicle. Charge sustaining modes in PMM of either series or parallel are also depicted in the FIG. 12.

As may be seen, the BMMS may optionally set a minimum SOC floor (1202) shown to prevent battery damage, or protect warranty obligations.

FIG. 12 shows the plot of battery State of Charge SOC, vehicle speed and time. Curve 1208 depicts this exemplary drive cycle. Curve 1208 starts from a dead stop (vehicle speed=0) and at a high SOC. As the vehicle drives in AEM mode, the battery is shown as being depleted. The vehicle is driven along the black line in the AEM mode until the battery SOC gets to the high SOC plane (1206) at A. At this point, the vehicle may stay in the AEM mode or go to the PMM mode but the battery may continue to deplete to the low SOC plane (1204) at B.

At B, the vehicle may switch to the PMM and the battery may be charged until the SOC reaches the High SOC plane again at C. The batteries may again be depleted while driving in the PMM mode or the AEM mode. In the case that the vehicle is in the mountains or in a high continuous load situation (such as towing a trailer), then the SOC may go below the low SOC plane. This may be desirable to maintain performance or for safety reasons. But with this high performance demand the battery may continue to discharge until it reaches a Minimum SOC plane (1202) below which the batteries are not allowed to go.

In one embodiment, the vehicle controller may then warn the driver that (s)he will not be able to continue driving at this performance level and begin to limit performance to protect the batteries. The vehicle may slow down as the power may be reduced to protect the batteries. The power reduction may begin before reaching the SOC floor so that the driver is warned that (s)he is approaching the floor by gradually reducing the power available by some amount—e.g., say 5% every 10 seconds or so.

FIG. 12 also helps to show the relation between the three planes the high SOC the low SOC and the floor. In one aspect, the BMMS policy may be to achieve the lowest fuel consumption—and in one embodiment, the engine may be downsized to a minimum to maintain a constant speed on a level road. Small variations in the road or road load may have to be taken out of the batteries until the floor is reached and the vehicle output power and vehicle power capability may be reduced. Vehicle torque capability may be maintained by a transmission if available by shifting to a higher reduction or lower gear.

In another embodiment, the "Degree of Hybridization" or the relative size of the engine and motor/battery pack may determine the potential minimum SOC and Delta SOC. For example, if the engine is minimized and the vehicle power demand is high on the average and high with a large variance, then the minimum SOC should be set higher since the battery and electric motor may be needed to fill in the power deficit from the engine very frequently. If the engine or prime mover is large, then the SOC may be set lower for a longer All Electric Range (AER), but the vehicle highway fuel economy in Charge Sustaining Mode may be less due to the larger engine and therefore lower efficiency of engine operation.

In one embodiment, the vehicle may be designed such that when the engine runs, the engine should be large enough to carry an assumed full load on a level or near level road. Where there are high continuous load possibilities such as mountain driving or trailer towing, the Average SOC and the Delta SOC should also be larger or dynamically increased. The prime mover power must be large enough to satisfy the load at the required speed with the specified load and grade for a long time or steady state. The engine may be downsized further but then the speed may not be maintained with the specified load for a long time. Thus a trade-off may be made in the degree of hybridization and the ability to maintain speed on a level road or minimum grade.

For example, the top speed of the vehicle may be determined by the sum of the power of the prime mover and the electric motor and battery power. But how long this speed can be maintained may be determined by the battery pack size. After the pack is depleted to the minimum SOC determined by the vehicle controller battery program, the speed may be gradually reduced to that speed sustainable by the engine alone. Thus the Degree of hybridization may be limited to sustained vehicle speed.

The Degree of Hybridization may also be used to determine battery specifications and motor size. But the minimum cost may be determined by the minimum battery size and power. An optimum battery capacity (kwhrs) and power (kw) may be determined to satisfy the performance requirements and the cost target. An optimization algorithm as a function of driving expectations, fuel economy expectations and acceleration performance specifications may be determined to minimize vehicle costs and petroleum energy consumption. Tax credit for 40% savings in fuel over a standard vehicle regardless of the Degree of Hybridization may be the overall rule that may determine the engine size needed.

The above policy of vehicle control may be affected to maximize the Vehicle Degree of Hybridization, DOH, but yet to protect the batteries from going into a zone where its life and performance may be affected below that predicted by the battery manufacturer.

As a general rule, PHEVs will be used to displace fossil fuel and used to enable use of renewable energy. It may be desirable then to use a larger battery pack capable of a longer range AEM. Thus, the use of renewable energy from local solar and wind can be integrated into the high DOH vehicle.

This concept will allow the high DOH vehicle to displace the most fossil fuel while maintaining the performance with the battery pack. The performance may not be maintained long but long enough to provide the users' needs for over 90% of the driving needs. The few incidences where the performance falls below the low SOC plane and approaches the floor where performance may be curtailed is to be as few as possible based on the specification of the vehicle. If the frequency of reaching the floor is frequent and the driver and owner needs more performance, then the PHEV may be supplied with a larger engine for this particular purpose. For a PHEV manufacturer, many variations of the vehicle may be offered—e.g., with 3 or more engine sizes. It may also be desirable to offer 3 or more DOH configurations for the same vehicle. It may be noted that battery management may consider the DOH along with the architecture as both could affect the robustness of the BMMS.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

The invention claimed is:

1. A method for optimizing an operation of a powertrain for an HEV vehicle, the powertrain for the HEV vehicle comprising a prime mover; a first electric motor-generator, said first electric motor-generator mechanically coupled to said prime mover via a first clutch; a second electric motor-generator, said second electric motor-generator mechanically coupled to said first electric motor-generator via a second clutch; a battery, said battery electrically coupled to said first electric motor-generator and said second electric motor-generator, said battery configured to supply electrical energy to said first electric motor-generator and said second electric motor-generator; and a controller, said controller configured to receive signals from one or more sensors and supplying control signals to said prime mover, said first clutch, said first electric motor-generator, said second clutch and said second electric motor-generator; said method comprising:

determining torque and speed of the first electric motor-generator;

determining torque and speed of the second electric motor-generator;

upon a power demand by a user, determining a combination of torque and speed of both first electric motor-generator and said second electric motor-generator according to motor efficiency information of both first electric motor-generator and said second electric motor-generator; wherein determining the combination of torque and speed further comprise:

determining coefficients, a and b, such that the combination of (a*M1) +(b*M2) is more efficient than other coefficients; and wherein M1 and M2 are the respective efficiencies of the first electric motor-generator and the second electric motor-generator; and further wherein the combination of torque and speed of both first electric motor-generator and said second electric motor-generator is more efficient than other combinations of said torque and speed.

2. The method of claim 1 wherein said M1 and M2 are determined from torque-speed efficiency maps of the first electric motor-generator and said second electric motor-generator respectively.

3. The method of claim 2 wherein said M1 and M2 are stored in a Look-Up Table and accessed by the controller to determine coefficients a and b.

4. The method of claim 1 wherein said powertrain further comprises a variable ratio transmission, said variable ratio transmission configured to be controlled by signal from said controller and wherein said method further comprises:
controlling said first electric motor-generator on its Ideal Operating Line (IOL) while affecting a change in torque according to changes in user's power demand.

5. A method for controlling a powertrain for an HEV vehicle, the powertrain for the HEV vehicle comprising a prime mover; a first electric motor-generator, said first electric motor-generator mechanically coupled to said prime mover via a first clutch; a second electric motor-generator, said second electric motor-generator mechanically coupled to said first electric motor-generator via a second clutch; a battery, said battery electrically coupled to said first electric motor-generator and said second electric motor-generator, said battery configured to supply electrical energy to said first electric motor-generator and said second electric motor-generator; and a controller, said controller configured to receive signals from one or more sensors and supplying control signals to said prime mover, said first clutch, said first electric motor-generator, said second clutch and said second electric motor-generator; said method comprising:
sensing a speed of said first electric motor-generator and said second electric motor-generator;
determining said first electric motor-generator and said second electric motor-generator maximum torque limits;
upon a torque demand from a user, determining a set of allowable torque combinations of said first electric motor-generator and said second electric motor-generator to achieve the torque demand; wherein determining the set of allowable torque combinations further comprise:
determining coefficients, a and b, such that the combination of (a*M1) +(b*M2) is more efficient than other coefficients; and
wherein M1 and M2 are the respective efficiencies of the first electric motor-generator and the second electric motor-generator; and
sending torque control signals based on said set of allowable torque combinations to said first electric motor-generator and said second electric motor-generator, according to the coefficients determined.

6. The method of claim 5 wherein said powertrain further comprises a variable ratio transmission, said variable ratio transmission configured to be controlled by signal from said controller and wherein said method further comprises:
controlling said first electric motor-generator on its Ideal Operating Line (IOL) while affecting a change in torque according to changes in user's power demand.

* * * * *